US012193609B2

(12) United States Patent
Kim et al.

(10) Patent No.: US 12,193,609 B2
(45) Date of Patent: Jan. 14, 2025

(54) BLENDER

(71) Applicant: LG ELECTRONICS INC., Seoul (KR)

(72) Inventors: Youngsoo Kim, Seoul (KR); Junho Seok, Seoul (KR); Jeonghoon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 17/609,196

(22) PCT Filed: May 7, 2020

(86) PCT No.: PCT/KR2020/006018
§ 371 (c)(1),
(2) Date: Nov. 5, 2021

(87) PCT Pub. No.: WO2020/226433
PCT Pub. Date: Nov. 12, 2020

(65) Prior Publication Data
US 2022/0225839 A1 Jul. 21, 2022

(30) Foreign Application Priority Data

May 8, 2019 (KR) .......................... 10-2019-0053929

(51) Int. Cl.
A47J 43/07 (2006.01)
A47J 43/046 (2006.01)
A47J 43/08 (2006.01)

(52) U.S. Cl.
CPC ......... A47J 43/0727 (2013.01); A47J 43/046 (2013.01); A47J 43/0722 (2013.01); A47J 43/0761 (2013.01); A47J 43/085 (2013.01)

(58) Field of Classification Search
CPC .................. A47J 43/046; A47J 43/0716; A47J 43/0761; A47J 43/085; H02K 5/20; H02K 9/04; H02K 9/06
See application file for complete search history.

(56) References Cited

U.S. PATENT DOCUMENTS 5,273,358 A * 12/1993 Byrne ...................... H02K 9/06
366/205
10,111,558 B2 10/2018 Dickson, Jr. et al.
(Continued)

FOREIGN PATENT DOCUMENTS

CN 102665496 9/2012
CN 204071831 1/2015
(Continued)

OTHER PUBLICATIONS

Extended European Search Report dated Jul. 19, 2023 issued in Application No. 20801841.6.
(Continued)

Primary Examiner — Debra M Sullivan
Assistant Examiner — Matthew Stephens
(74) Attorney, Agent, or Firm — KED & ASSOCIATES, LLP

(57) ABSTRACT

A blender comprises: a jar in which a blade is placed; a body in which the jar is seated and having an opened lower surface; a motor which is provided inside the body and rotates the blade; a fan which is provided at the lower end of a rotary shaft of the motor and rotates when the motor is driven to generate an air flow inside the body; a PCB placed between the body and the motor; a base plate which blocks the lower surface of the body and includes a suction port via which air is sucked into the body, and a drain port via which air is discharged outside of the body; and an air guide which connects the motor to the drain port to form a discharge path (Continued)

of air, the PCB being placed over the suction port and cooled by the sucked air.

22 Claims, 27 Drawing Sheets

(56) References Cited

U.S. PATENT DOCUMENTS

| | | | |
|---|---|---|---|
| 2002/0176320 A1 | 11/2002 | Wulf et al. | |
| 2011/0222367 A1 | 9/2011 | Allen | |
| 2012/0294109 A1 | 11/2012 | Boozer | |
| 2013/0003490 A1 | 1/2013 | Kemker et al. | |
| 2014/0286123 A1 | 9/2014 | Arnett et al. | |
| 2014/0301155 A1 | 10/2014 | Montgomery | |
| 2015/0044344 A1 | 2/2015 | Choi | |
| 2016/0117022 A1 | 4/2016 | Kim et al. | |
| 2016/0256005 A1 | 9/2016 | Dickson, Jr. et al. | |
| 2016/0374515 A1 | 12/2016 | Stuart et al. | |
| 2017/0265684 A1 | 9/2017 | Roberts et al. | |
| 2018/0117552 A1* | 5/2018 | Kozlowski | A47J 43/046 |
| 2018/0123501 A1* | 5/2018 | Xiang | A47J 43/075 366/205 |
| 2019/0208961 A1 | 7/2019 | Arnett et al. | |

FOREIGN PATENT DOCUMENTS

| | | | | |
|---|---|---|---|---|
| CN | 205286123 | | 6/2016 | |
| CN | 205753782 | | 11/2016 | |
| CN | 205831683 | | 12/2016 | |
| CN | 205831683 U | * | 12/2016 | ............ A47J 43/046 |
| CN | 206565829 | | 10/2017 | |
| CN | 107788841 | | 3/2018 | |
| CN | 107951417 | | 4/2018 | |
| CN | 108245045 | | 7/2018 | |
| CN | 108309093 | | 7/2018 | |
| CN | 108402929 | | 8/2018 | |
| CN | 208192974 | | 12/2018 | |
| CN | 208192974 U | * | 12/2018 | ............ A47J 43/046 |
| KR | 20-2013-0000329 | | 1/2013 | |
| KR | 10-2017-0091433 | | 8/2017 | |
| KR | 10-2017-0122328 | | 11/2017 | |
| KR | 10-2017-0129175 | | 11/2017 | |
| KR | 10-2018-0009804 | | 1/2018 | |
| KR | 10-1971101 | | 4/2019 | |
| WO | WO 2009/049355 | | 4/2009 | |
| WO | WO 2018/034979 | | 2/2018 | |
| WO | WO 2018/072505 | | 4/2018 | |
| WO | WO 2018/201653 | | 11/2018 | |

OTHER PUBLICATIONS

International Search Report (with English Translation) and Written Opinion dated Aug. 13, 2020 issued in Application No. PCT/KR2020/006018.
Australian Office Action dated Mar. 31, 2023 issued in Application No. 2020269750.
Chinese Office Action dated May 27, 2023 issued in Application No. 202080033362.4.
Chinese Office Action dated Jun. 4, 2023 issued in Application No. 202080033372.8.
Extended European Search Report dated Jun. 21, 2023 issued in Application No. 20802437.2.
Chinese Notice of Allowance dated Feb. 1, 2024 issued in Application No. 202080033372.8.
Korean Office Action dated Oct. 1, 2024 issued in Application No. 10-2019-0106703.

* cited by examiner

BLENDER

CROSS-REFERENCE TO RELATED PATENT APPLICATIONS

This application is a U.S. National Stage Application under 35 U.S.C. § 371 of PCT Application No. PCT/KR2020/006018, filed May 7, 2020, which claims priority to Korean Patent Application No. 10-2019-0053929, filed May 8, 2019, whose entire disclosures are hereby incorporated by reference.

TECHNICAL FIELD

The present invention relates to a blender.

BACKGROUND ART

In general, a blender is a home appliance that cuts food contained in a container by a blade rotating by an electric motor, crushes food into powder, or makes food into a liquid-like state, and is also commonly referred to as a blender.

In a general blender, a container is seated on a top surface of the body in which a motor is embedded, and when the container is seated, a blade inside the container is connected to a rotation shaft of the motor to be in a rotatable state. In addition, the user may drive the motor by manipulating the body after putting the food in the container, and the blade may rotate by the driving of the motor to crush the food.

Such a blender has recently been developed as a large-capacity blender with a large container, and also, a blender using a motor rotating at a high speed to more effectively crush various foods is being developed.

An output of the motor for the high-speed rotation may increase, and as the rotation speed increases, the motor may generate heat having a high temperature, and thus, a problem in which a PCB for controlling the motor is overheated and damaged may occur.

In order to solve this problem, Korea Utility Model No. 20-2013-0000329 discloses an air cooling type blender having a structure in which external air is suctioned into a body by using driving force of a motor to cool the motor, and then the air absorbing heat is discharged to the outside of the body.

However, in the related art, a suction hole is formed in a center of a bottom surface of the body, and a discharge hole is formed outside the bottom surface of the body, and thus, suction or discharge efficiency is not good depending on a state of the floor on which the body is disposed.

In addition, Korean Patent Publication No. 10-2017-0122328 discloses a dual air cooling type blender, in which air is suctioned into the body when a motor is driven to primarily cool the inside of the body and then is discharged after passing through the motor to secondarily cool the motor.

However, in the related art, a discharge hole is formed in a center of a bottom surface of the body, and a suction hole is formed outside the bottom surface of the body, and thus, suction or discharge efficiency is not good depending on a state of the floor on which the body is disposed.

In addition, such the related arts also have a problem in that heated air is recirculated to adjacent positions of the suction hole and the discharge hole.

DISCLOSURE OF THE INVENTION

Technical Problem

An embodiment of the present invention aims to provide a blender in which cooling efficiency inside the body is improved.

An embodiment of the present invention aims to provide a blender capable of simultaneously cooling internal components of a body including a motor.

An embodiment of the present invention aims to provide a blender in which cooling inside a body is guaranteed regardless of installation locations and environments.

An embodiment of the present invention aims to provide a blender capable of intensive cooling of specific electronic components inside a body.

An embodiment of the present invention aims to provide a blender capable of improving heat dissipation of a PCB inside a body.

An embodiment of the present invention aims to provide a blender capable of efficiently implementing a spatial arrangement of the inside of a body.

Technical Solution

A blender according to an embodiment of the present invention includes: a body in which a motor assembly for rotation of a blade is accommodated; a cooling fan coupled to the motor assembly; a cover plate configured to shield an opened bottom surface of the body; a plate suction hole and a plate discharge hole, which are opened to the cover plate; an air guide configured to connect one side of the motor assembly to the discharge hole to provide a cooling air passage; and a PCB module disposed above the plate suction hole so as to be cooled by suctioned air.

A blender according to an embodiment of the present invention includes: a body in which a motor assembly is accommodated, and a suction hole and a discharge hole are defined; and a cooling fan provided inside the body, wherein the motor assembly is disposed between the suction hole and the discharge hole, the cooling fan is disposed between the motor assembly and the discharge hole, and a PCB module is disposed between the motor assembly and the suction hole.

A blender according to an embodiment of the present invention includes: a body; a motor assembly configured to rotate a blade module inside the body; a cooling fan provided inside the body; a PCB module provided inside the body; and a bottom cover configured to shield an opened bottoms surface of the body, wherein the bottom cover includes a bottom plate portion spaced apart from the ground to define a bottom surface of the body and a bottom edge configured to connect a circumference of the bottom plate portion to a lower end of the body, a bottom suction hole and a bottom discharge hole are defined in the bottom plate, and an edge suction hole and an edge discharge hole are defined in the bottom edge.

A blender according to an embodiment of the present invention includes: a body; a motor assembly provided inside the body and configured to rotate a blade; a suction hole and a discharge hole, which are defined in the body; a cooling fan provided in the motor assembly to force a flow of air within the suction hole and the discharge hole; and an inverter PCB module configured to control a rotation speed of the motor assembly, wherein the inverter PCB module is disposed at a side of the suction hole.

The inverter PCB module may include a heat dissipation member, and the heat dissipation member may be disposed to overlap the suction hole.

A blender according to an embodiment of the present invention includes: a body in which a motor assembly is accommodated; a cooling fan inside the body; a PCB module disposed between an inner surface of the body and the motor assembly; and a suction hole and a discharge hole, which are defined in a bottom surface of the body and are opened below the PCB module.

The PCB module may be provided in plurality, which are disposed to face each other.

The body may have a hexahedral shape, and the PCB module may be disposed on an inner circumferential surface of the body.

A blender according to an embodiment of the present invention includes: a jar in which a blade module, in which food is crushed, is disposed; a body on which the jar is seated and of which a bottom surface is opened; a motor assembly provided inside the body and configured to rotate the blade module; a cooling fan provided at a lower end of a rotation shaft of the motor assembly, the cooling fan being rotated when the motor assembly is driven to force a flow of air within the body; a PCB module disposed between a circumferential surface of the body and the motor assembly; a base plate configured to shield the opened bottom surface of the body, the base plate comprising a plate suction hole through which air is suctioned into the body and a plate discharge hole through which the air is discharged to the outside of the body; and an air guide configured to connect the motor assembly to the discharge hole so as to define an air discharge path, wherein the PCB module is disposed above the plate suction hole and is cooled by the suctioned air.

The air guide may be mounted on the base plate and be configured to support the motor assembly from a lower side.

An upper end of the motor assembly may be further restricted on an inner top surface of the body.

The motor assembly may be disposed between the plate suction hole and the plate discharge hole.

The PCB module may be disposed between the motor assembly and the plate suction hole.

The PCB module may include an inverter PCB module configured to control variable speed rotation of the motor assembly.

The air guide may include: a guide hole configured to communicate with the motor assembly; and a circumferential surface disposed along a circumference of an opened bottom surface of the air guide, the circumferential surface extending to be in contact with the base plate so as to define an air flow space.

The cooling fan may pass through the guide hole and is provided inside the air flow space.

The plate discharge hole may be defined in an inner area of the circumferential surface.

The plate discharge hole may be defined in one end of the base plate, and the plate suction hole may be defined outside the circumferential surface, the plate suction hole being defined in the other end of the base plate, which faces the plate discharge hole.

A coupling protrusion coupled to the base plate may be disposed on a lower end of the circumferential surface.

A supporting member configured to seal a gap between the motor assembly and the air guide may be provided on a circumference of the guide hole.

The motor assembly may include: a motor comprising a motor shaft configured to serve as a rotation shaft; a motor housing in which the motor is accommodated; an upper hole opened at one side of the motor housing; and a lower hole opened at the other side of the motor housing to communicate with the air guide, wherein the cooling fan may be coupled to the rotation shaft at a lower side of the lower hole to force a flow of air passing through the upper hole and the lower hole when the motor rotates.

The upper hole may be defined above the motor, and the lower hole may be defined below the motor.

A housing mounting portion protruding outward may be disposed on the motor housing, and the housing mounting portion may be coupled to an inner surface of the body so that the upper hole is spaced apart from the inner surface of the body.

The PCB module may be provided in plurality, and an inverter PCB module configured to control a rotation speed of the motor among the plurality of PCB modules may be disposed at a side of the plate suction hole.

The inverter PCB module may include: a PCB having one surface on which an element is mounted; and a heat dissipation member disposed on the other surface to dissipate heat of the PCB, wherein the heat dissipation member may be disposed to overlap the plate suction hole.

The heat dissipation member may include a fins extending in a vertical direction and provided in plurality, which are continuously disposed to be spaced apart from each other, and the fin may extend in a direction crossing the plate suction hole.

The blender may further include a bottom cover below the base plate, wherein the bottom cover may include: a bottom plate portion disposed to be spaced apart from the ground, the bottom plate portion being configured to define a bottom surface of the body; and a bottom edge extending along a circumference of the bottom plate portion so as to be coupled to a circumference of the opened bottom surface of the body, wherein a cover suction hole and a cover discharge hole may be defined in the bottom cover to correspond to the plate suction hole and the plate discharge hole, respectively.

The cover suction hole may include: a bottom suction hole opened in the bottom plate portion vertically below the plate suction hole; and an edge suction hole defined along the bottom edge to correspond to the bottom suction hole, wherein the cover discharge hole may include: a bottom discharge hole opened in the bottom plate portion vertically below the plate discharge hole; and an edge discharge hole defined along the bottom edge to correspond to the bottom discharge hole.

Advantageous Effects

The blender according to the embodiment of the present invention may expect the following effects.

In the blender according to the embodiment of the present invention, the cooling fan may be provided in the motor assembly for the rotation of the blade inside the body so that the cooling fan rotates when the motor assembly rotates. In addition, the PCB module may be disposed between the motor assembly and the suction hole, and thus, the motor and the PCB module may be simultaneously cooled when the motor assembly rotates to improve the cooling efficiency of the inside of the body.

In addition, the air guide connecting the motor assembly to the discharge hole may be provided, and the cooling fan may be accommodated inside the air guide so that the flow of the cooling air inside the body is concentrated to the motor assembly and the suction hole, thereby intensively cooling the motor and the PCB module.

In addition, the plurality of the PCB modules may be provided. Particularly, the inverter PCB module for controlling the variable speed of the motor may be disposed on the suction hole-side so as to be cooled first by the cooling air introduced into the body, thereby intensively cooling the inverter PCB module.

In addition, the high-speed operation performance of the blender may be ensured by cooling the inverter PCB module, which generates a lot of heat, and the durability of the blender may be improved through the improvement of the cooling performance.

In addition, the heat dissipation member of the inverter PCB module may overlap the suction hole so that the suctioned air passes through the heat dissipation member to more effectively cool the inverter PCB.

In addition, the plurality of fins of the heat dissipation member may be spaced apart from each other, and the extension directions of the suction hole and the fins may cross each other to significantly improve the heat exchange performance when the air is suctioned, thereby ensuring the heat dissipation performance of the heat dissipation member.

In addition, the motor assembly may be disposed inside the body, and the plurality of PCB modules may be disposed between the circumference of the motor assembly and the circumference of the inner surface of the body, thereby efficiently use the internal space of the body.

In addition, the inverter PCB module for concentrating the cooling in the state in which the PCB module is disposed may be disposed at the suction hole-side to secure the cooling performance.

In addition, the plurality of PCB modules may be disposed on each of the surface of the inner surface of the body according to their functions and also have the detachable structure through the opened bottom surface of the body, thereby improving the assembly and the service performance.

In addition, the bottom cover may be mounted on the opened bottom surface of the body, and the bottom cover may define the bottom surface of the body and be spaced apart from the ground. The bottom cover may include the bottom plate portion defining the bottom surface and the bottom edge portion connecting the circumference of the bottom plate to the lower end of the body, and the suction and discharge holes may be defined in the bottom plate portion and the bottom edge portion to three-dimensionally realize the suction and discharge of the cooling air. Therefore, the suction and discharge of the air for cooling the body may be ensured regardless of the state of the ground or the arrangement position of the blender.

MODE FOR CARRYING OUT THE INVENTION

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

[Whole Structure of Outer Appearance]

Figure 1:
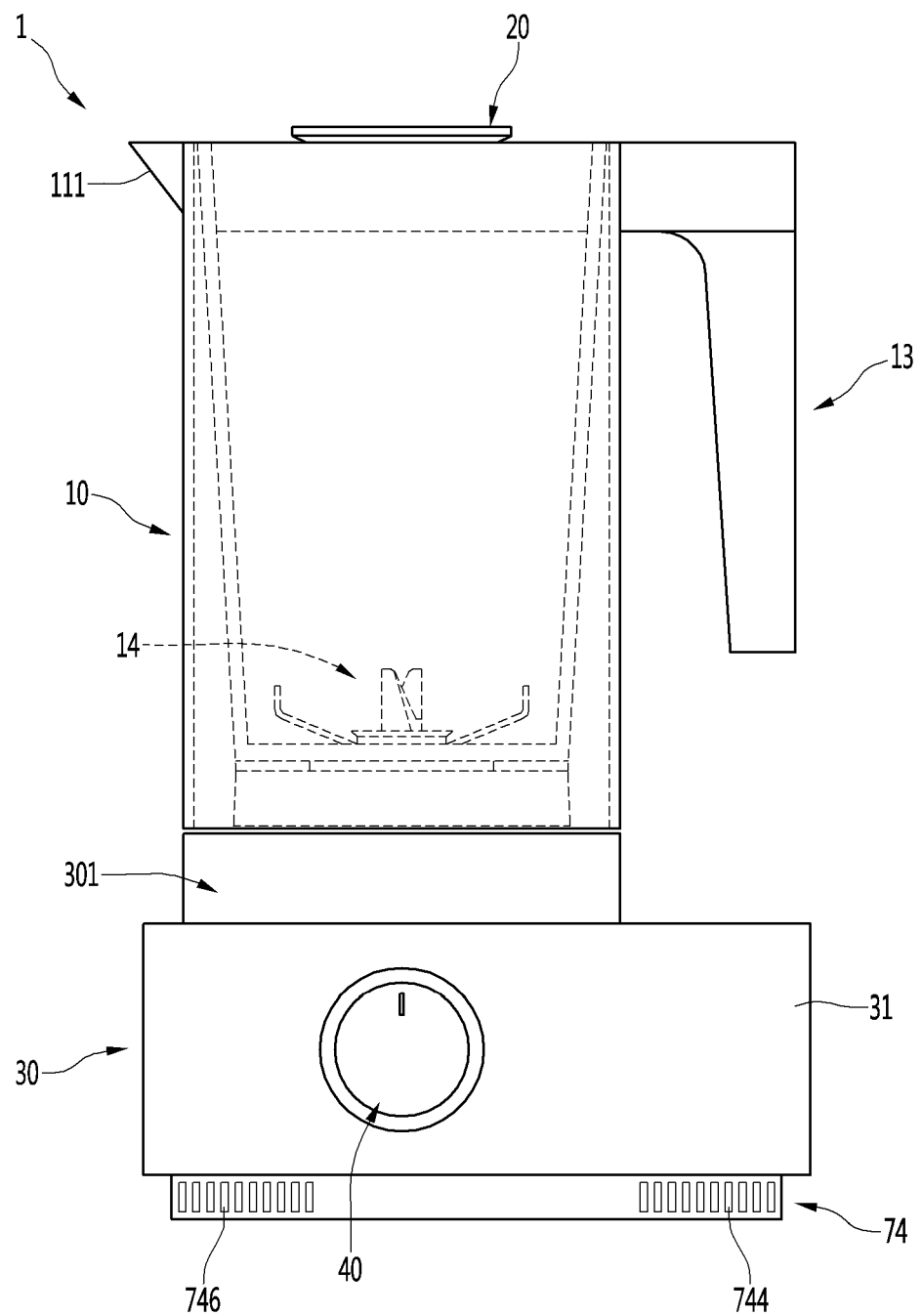
FIG. 1 is a front view of a blender according to an embodiment of the present invention.
Figure 2:
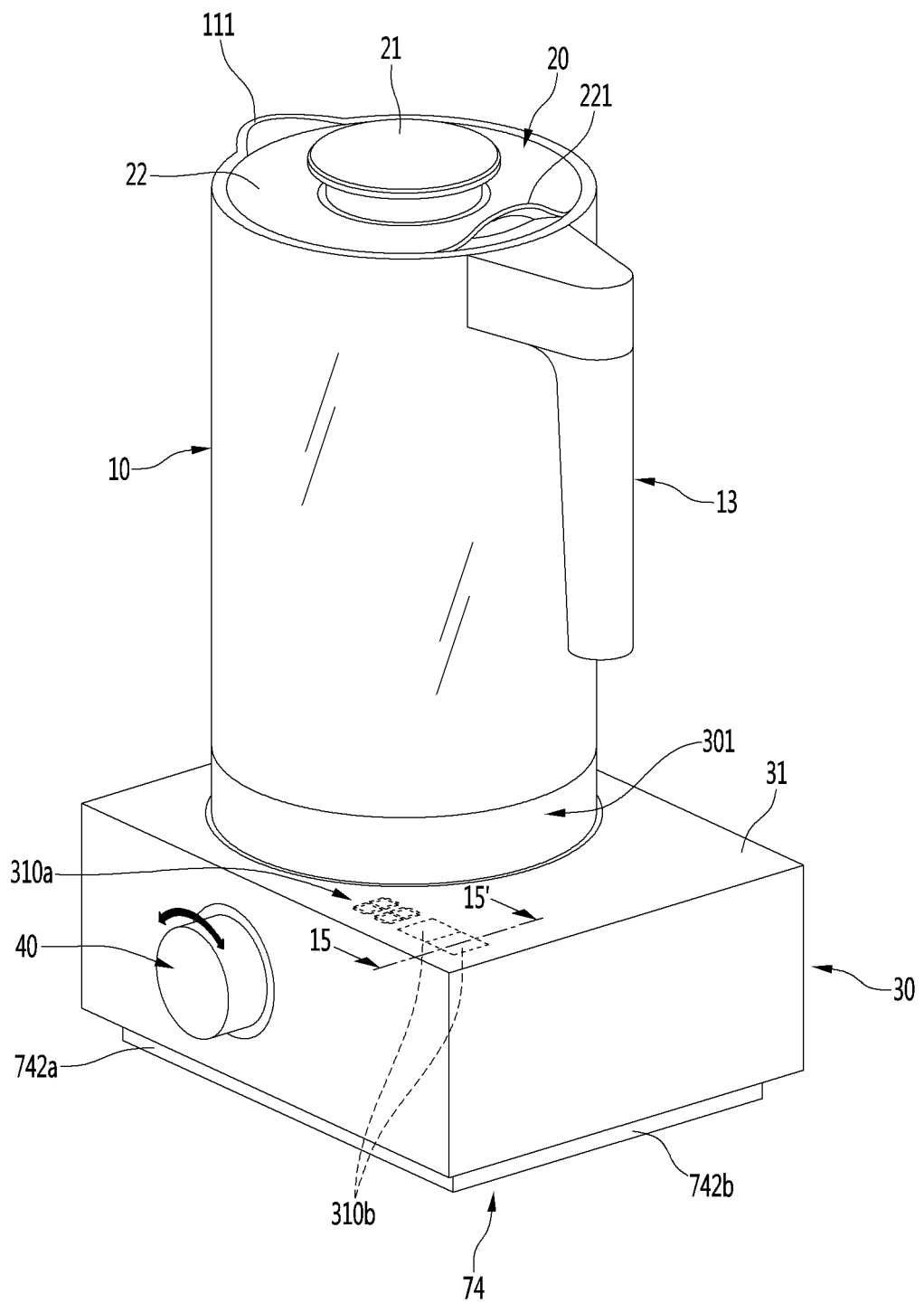
FIG. 2 is a perspective view of the blender.
Figure 3:
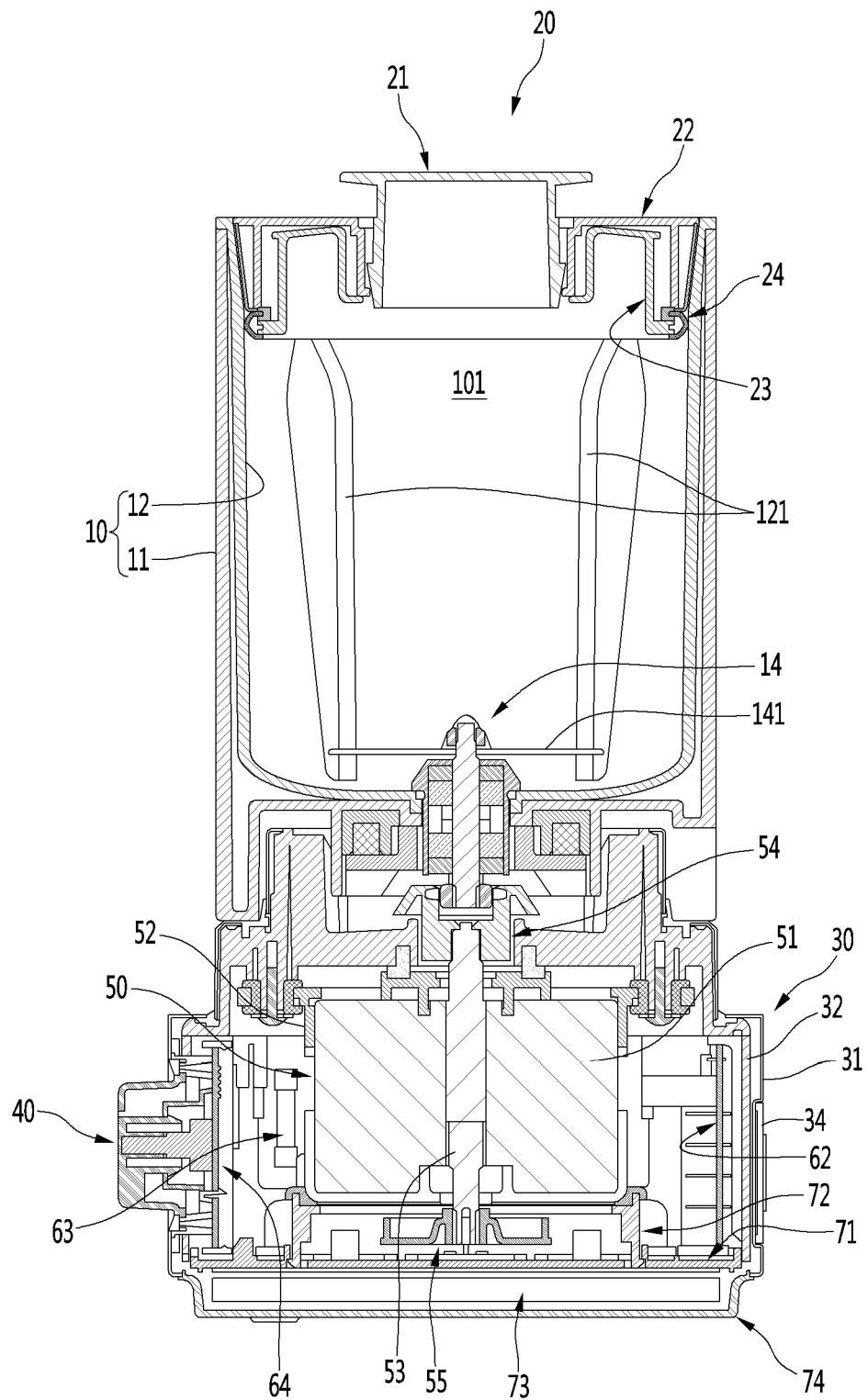
FIG. 3 is a longitudinal cross-sectional view of the blender.

FIG. 1 is a front view of a blender according to an embodiment of the present invention. Also, FIG. 2 is a perspective view of the blender. Also, FIG. 3 is a longitudinal cross-sectional view of the blender.

For the convenience of explanation and understanding, directions are defined first. A position at which a knob 40 is disposed is referred to as a front surface or a front side, and a portion to which a power connector (reference numeral 35 in FIG. 9) is connected is defined as a rear surface or a rear side. In addition, a position of the bottom of the body 30 may be referred to as a bottom surface or a lower side, and a position of an upper end of a jar (or container) 10 may be referred to as a top surface or an upper side. In addition, a left side with respect to the knob 40 may be referred to as a left surface or a left direction, and a right side with respect to the knob 40 may be defined as a right surface or a right direction.

As illustrated in the drawings, a blender 1 according to an embodiment of the present invention may include a body 30 disposed on the bottom surface, and a jar 10 seated on an upper portion of the body 30.

In the body 30, electrical devices and components including a motor assembly 50 and a PCB module 60 for an operation of the blender 1 may be disposed. In addition, manipulation portions 40 and 310b for manipulating the operation of the blender 1 and a display portion 310a for displaying the operation may be provided.

The body 30 may have a hexahedral shape as a whole, and a seating portion 301 for seating the jar 10 thereon may be provided on a top surface of the body 30. The seating portion 301 may be configured so that the jar 10 is detachable in a vertical direction.

An outer appearance of the body 30 may be defined by an outer case 31 made of a metal material or having a metal texture, and the outer case 31 may have a hexahedral shape with an opened bottom surface. In addition, an inner case 32 may be provided inside the outer case 31, and a space in which the motor assembly 50 and the PCB module 60 are mounted may be provided inside the inner case 32.

The knob 40 for setting the operation of the blender 1 by a user may be provided on the front surface of the body 30. The knob 40 may protrude from the front surface of the body 30 and may manipulate and set the operation of the blender 1 by rotation thereof.

A bottom cover 74 may be provided on the bottom surface of the body 30. The bottom cover 74 may be coupled to the outer case 31 and the inner case 32 and may be disposed to be in contact with a bottom surface on which the blender 1 is installed. In addition, the bottom cover 74 may allow the outer case 31 and the inner case 32 to be spaced apart from the bottom surface, and a cover suction hole 744 and a cover discharge hole 746, through which air is suctioned into and discharged from the body 30, may be defined in the bottom cover 74.

A display portion 310a for visualizing an operation state of the blender 1 may be provided on the top surface of the body 30. For example, the display portion 310a may be provided in the form of at least one seven-segment display. In addition, touch manipulation portions 40 and 310b capable of manipulating start or stop of the operation of the blender 1 may be provided on the top surface of the body 30. For manipulating the blender 1, the manipulation portions 40 and 310b may include at least one of the knob 40 or the touch module 65.

In addition, the seating portion 301 may be provided on the top surface of the body 30. The seating portion 301 may protrude from the top surface of the body 30, and a portion of the seating portion 301 may be inserted into a bottom surface of the jar 10 to stably support the jar 10. When the jar 10 is seated on the seating portion 301, the motor assembly 50 and the blade module 14 inside the jar may be coupled to each other to transmit rotational force to the blade module 14.

The seating portion 301 may be disposed at one side that is slightly biased from a center of the body 30. A total horizontal length including a handle 13 of the jar 10 and a horizontal length of the body 30 correspond to each other. Thus, a center of a food accommodation space of the jar 10 may be disposed to be eccentric from a center of the body 30, and a center of the seating portion 301 may also be disposed in the same extension line as the center of the jar 10. In addition, the knob 40 may be disposed at a position corresponding to the center line of the seating portion 301 and the jar 10 and may be disposed at an eccentric side of the front surface of the body 30.

The seating portion 301 may also be made of the same material as the outer case 31. The seating portion 301 may be made of a metal material or a material having a metal texture to have a sense of unity with the outer appearance of the body as a whole.

The motor assembly 50 may be mounted inside the body 30 below the seating portion 301. The motor assembly 50 may be provided for rotation of the blade module 14 inside the jar 10 and may rotate at a high speed. In addition, the motor assembly 50 may adjust the rotation speed according to the manipulation of the knob 40.

An upper end of the motor assembly 50 may be connected to the blade module 14 inside the jar 10. In addition, a cooling fan 55 may be provided at a lower end of the motor assembly 50, and when the motor assembly 50 is driven, the cooling fan 55 may rotate at the same time with the blade module 14 to force a flow of cooling air inside the body 30.

A plurality of PCB modules 60 may be disposed on an inner wall surface of the inner case 32 defining an inner surface of the body 30. The PCB module 60 may be provided in plurality and may be disposed around the inner surface of the body 30, that is, on front and rear surfaces and both left and right surfaces, respectively.

In addition, an opened bottom surface of the inner case 32 may be shielded by a base plate 71. In addition, the base plate 71 may be provided with an air guide 72 for guiding the discharge of the cooling air suctioned by the cooling fan 55.

A predetermined space may be defined between the base plate 71 and the bottom cover 74, and a wireless power module 73 may be provided between the base plate 71 and the bottom cover 74. The wireless power module 73 may supply power to the motor assembly 50 in a wireless manner using induced electromotive force.

The jar 10 may be provided in a cylindrical shape corresponding to an outer diameter of the seating portion 301, and a top surface of the jar 10 may be opened to define the food accommodation space therein. The jar 10 may be made of glass or a material capable of visually recognizing the inside such as glass.

The jar 10 may be provided with a blade module 14 at a center of the inner bottom surface. The blade module 14 includes a plurality of blades 141 and may be connected to the motor assembly 50. Thus, when the motor assembly 50 is driven while the jar 10 is seated on the body 30, the blades 141 may rotate to crush or cut the food inside the jar 10.

In addition, a plurality of inner guides 121 for guiding the rotating food may be provided inside the jar 10. Each of the inner guides 121 may extend upward by a predetermined length from a lower end of the inner surface of the jar 10 and may extend to a bottom surface of a lid 20 when the lid 20 is mounted.

A spout 111 for pouring the crushed food may protrude from an upper end of the jar 10, and a handle 13 may protrude from one side facing the spout 111. The handle 13 may protrude outward from the upper end of the jar 10 to extend downward so that the user lifts or move the jar 10. The protruding end of the handle 13 may be disposed in the same extension line as a side end of the body 30.

In addition, the lid 20 may be mounted on the opened top surface of the jar 10. The lid 20 may shield the opened top surface of the jar 10, and the user may hold the lid handle 13 and separate the lid 20 from the jar 10 to open or close the opened top surface of the jar 10. The lid 20 may include a lid upper portion 22, a lid lower portion 23, and the lid handle 21, and a lid gasket 24 may be provided along a circumference of the lid 20.

[Structure of Jar]

Hereinafter, a structure of the jar 10 will be described in more detail with reference to the drawings.

Figure 4:
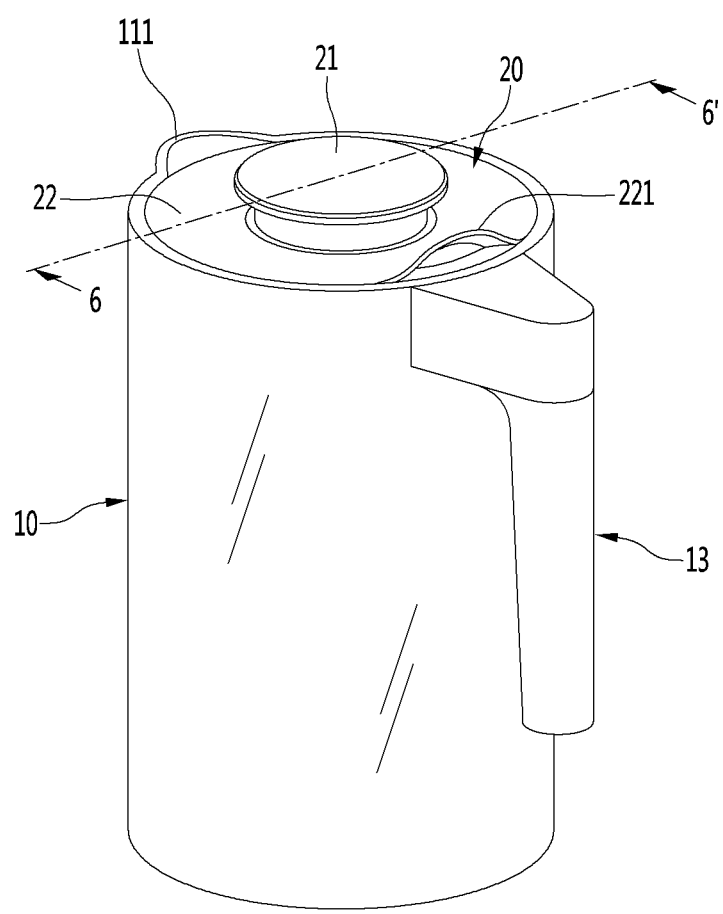
FIG. 4 is a perspective view of a jar that is one component of the blender.
Figure 5:
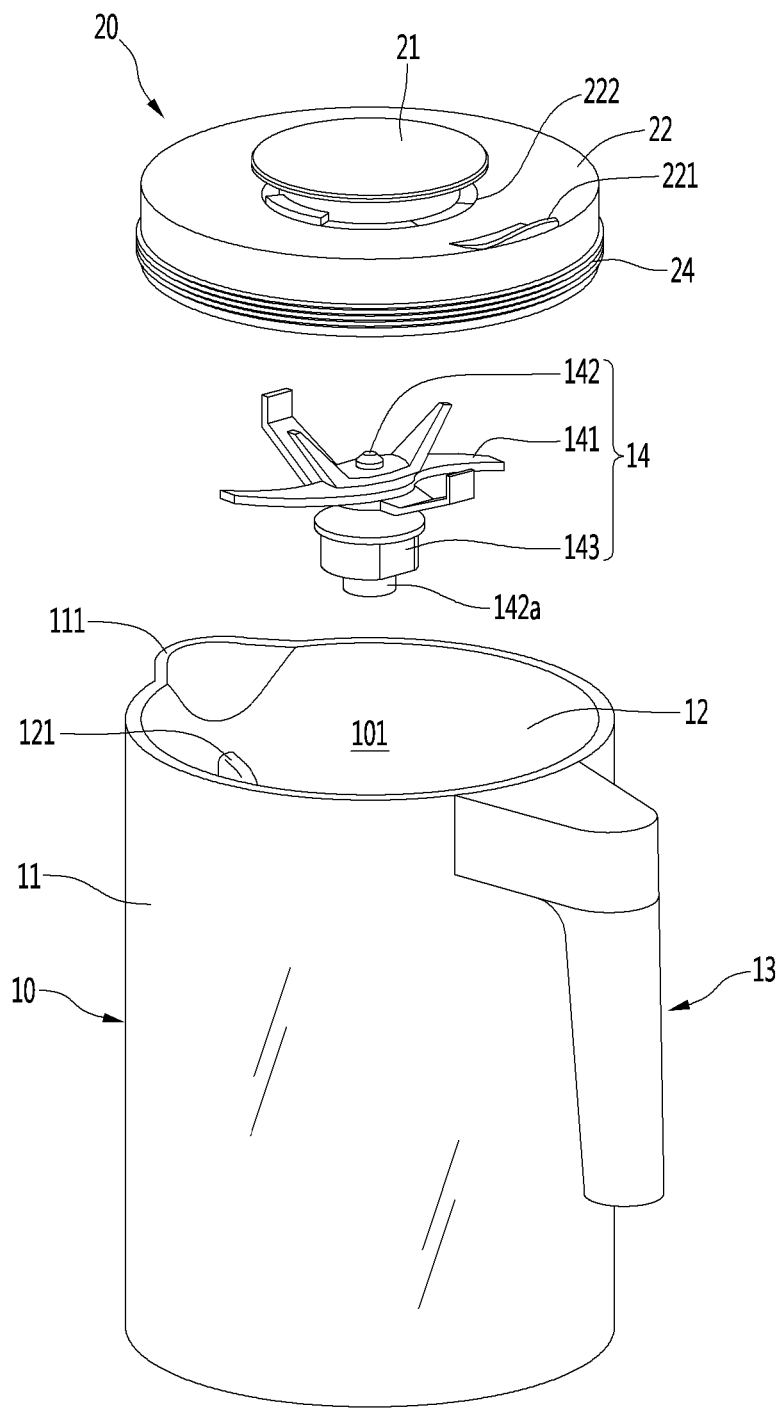
FIG. 5 is an exploded perspective view of the jar.
Figure 6:
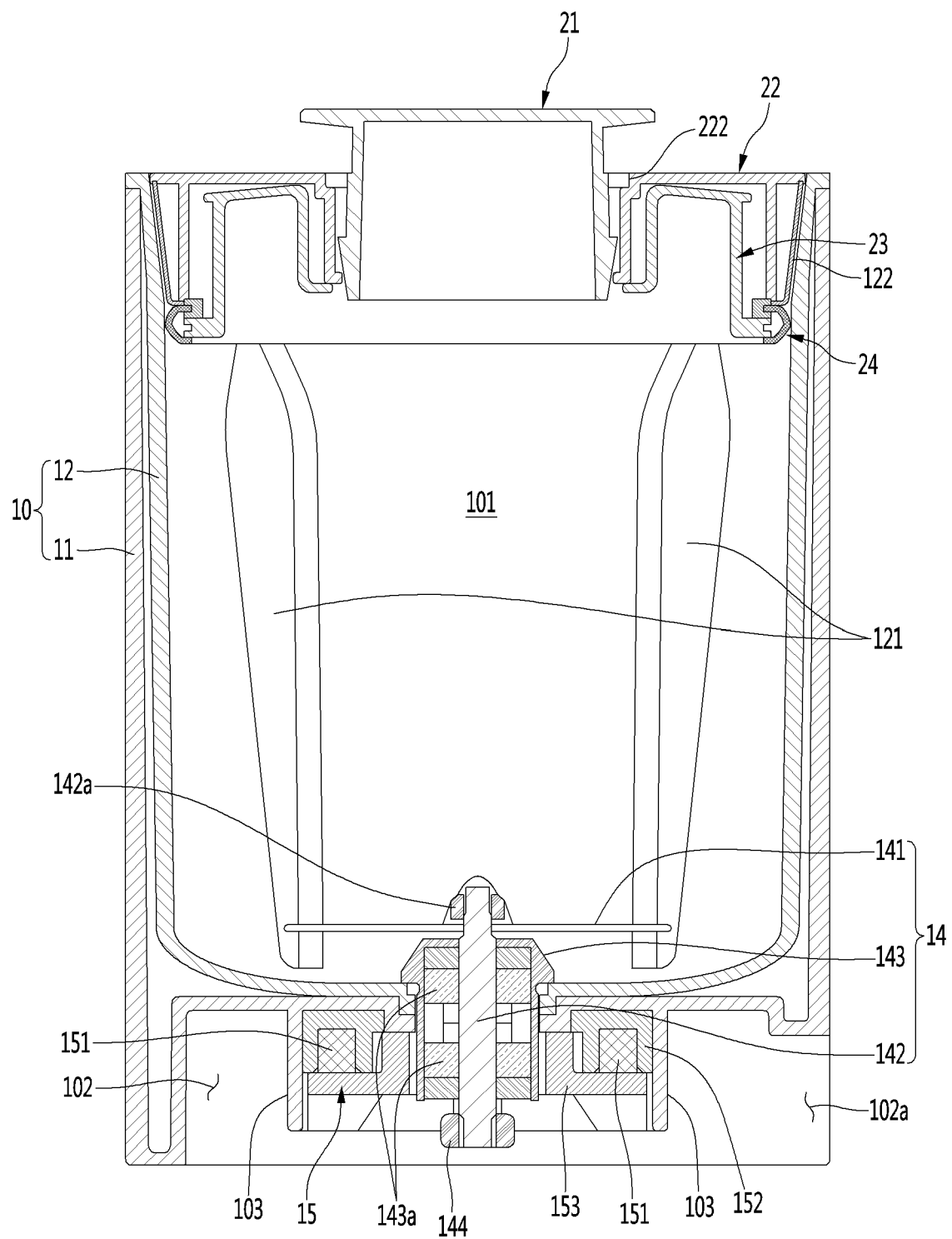
FIG. 6 is a cross-sectional view taken along line 6-6' of FIG. 4.

FIG. 4 is a perspective view of the jar that is one component of the blender. Also, FIG. 5 is an exploded perspective view of the jar. Also, FIG. 6 is a cross-sectional view taken along line 6-6' of FIG. 4.

As illustrated in the drawings, the jar 10 is provided in a cylindrical shape with an opened top surface. In addition, the blade module 14 may be mounted on the bottom surface of the jar 10, and the lid 20 may be detachably mounted on the opened top surface of the jar 10.

The jar 10 may be made of a material such as glass, tritan, transparent plastic, etc. so that the state of the food therein is checked during the operation of the blender 1. In addition, the jar 10 may include an outer jar 11 defining an outer shape, and an inner jar 12 defining an inner space in which food is accommodated.

The inner jar 10 and the outer jar 11 may be coupled to each other to define the overall shape of the jar 10, and the jar 10 may have a double-wall structure. In addition, the outer jar 11 may be provided in a cylindrical shape having the same outer diameter at an upper end and a lower end thereof so that the outer appearance of the jar 10 is seen neatly. In addition, an outer diameter of the outer jar 11 may be provided to be the same as an outer diameter of the seating portion 301, so that the body 30 and the jar 10 have a sense of unity when the jar 10 is mounted.

In addition, a body accommodation portion 102 may be defined in the bottom surface of the outer jar 11. The body accommodation portion 102 defines a space that is recessed upward from the bottom surface of the outer jar 11 and defines a space into which a second seating portion 325 to be described below is inserted. The body accommodation portion 102 and the second seating portion 325 may be coupled to each other so that the jar 10 is maintained in a state of being mounted on the seating portion 301.

In addition, a vent cutout portion 102a may be provided at one side of a lower end of the outer jar 11. The vent cutout portion 102a may provide a passage through which air is exhausted between the bottom surface of the jar 10 and the top surface of the seating portion 301 when the jar 10 and the seating portion 301 are coupled to or separated from each other. Thus, the jar 10 may be easily mounted on and separated from the seating portion 301. The vent cutout portion 102a may extend upward from the lower end of the outer jar 11 and may communicate with an internal space of the body accommodation portion 102.

A blade module mounting portion 103 on which the blade module 14 is mounted may be provided at a center of the bottom surface of the outer jar 11. The blade module mounting portion 103 may be disposed at an inner center of the body accommodation portion 102, and the blade module 14 may be disposed in the center of the jar 10.

The inner jar 12 may be spaced apart from the outer jar 11 to define a space between the outer jar 11 and the inner jar 12. The inner jar 12 may have a diameter that gradually decreases downward. A lower portion of the inner jar 12 may be inclined or rounded toward the blade module 14, and the food inside the jar 10 may be directed toward the blade module 14.

The blade module 14 may be configured to crush the food accommodated in the inner space 101 of the jar 10 and may include a plurality of blades 141, a blade shaft 142, and a shaft mounting body 143.

The plurality of blades 141 extend in different directions. Here, the plurality of blades may be combined with each other, and also, the plurality of blades may be disposed radially with respect to the blade shaft 142 as an axis. The blades 141 may be disposed to be symmetrical about the blade shaft 142, and extending directions, bent angles, and shapes of the plurality of blades 141 may be provided differently. That is, the blades 141 having various shapes may be combined and configured so as to be suitable for crushing and cutting various foods and making food into powder or liquid-like state.

The blade shaft 142 may be mounted to pass through the shaft mounting body 143 and may be supported by a bearing 143a inside the shaft mounting body 143. A plurality of the bearings 143a may be disposed in the vertical direction and may support the blade shaft 142 to rotate stably. In addition, the shaft mounting body 143 may be firmly fixed through the bottom surface of the jar 10.

A blade restriction member 142a is coupled to an upper end of the blade shaft 142 to prevent separation of the blade 141 and to maintain the blade 141 in a state of being fixed to the blade shaft 142.

In addition, a blade-side connection portion 144 may be disposed at a lower end of the blade shaft 142. The blade-side connection portion 144 may be exposed at the center of the bottom surface of the jar 10 to protrude downward. Thus, when the jar 10 is mounted on the seating portion 301, the blade-side connection portion 144 may be connected to a motor-side connection portion 54 to be described below so that the power of the motor assembly 50 is transmitted.

In addition, a magnet module 15 may be disposed inside the blade module mounting portion 103. The magnet module 15 may be provided on the bottom of the jar 10 so that a detection device 39 to be described below recognizes whether the jar is mounted when the jar is mounted.

In detail, the magnet module 15 may be configured to be penetrated by the blade module 14, and may be provided in a space between an inner surface of the blade module mounting portion 103 and an outer surface of the blade module 14.

Also, the magnet module 15 may be constituted by a magnet case 152 mounted inside the blade module mounting portion 130, a magnet 151 mounted on the magnet case 152, and a magnet cover 153 disposed below the magnet to shield the magnet 151. A plurality of the magnets 151 may be radially disposed around the blade module 14.

An upper end of the inner jar 12 may have an inclined surface 122 of which an inner diameter is narrowed downward. Therefore, in the process of inserting the lid 20 into the opened top surface of the jar 10, the lid 20 may have a structure that is sealed while being in gradually close contact with the inner jar 12. The inclined surface of the upper end of the inner jar 12 may be provided from the upper end of the jar 10 to the upper end of the inner guide 121 and may be disposed along a circumference of the inner surface of the jar 10. In addition, the inner guide 121 may be disposed on the inner surface of the inner jar 12. The inner guide 121 may extend from the inclined surface 122 to the bottom surface of the inner jar 12.

The lid 20 may include a lid upper portion 22 defining a top surface and a lid lower portion 23 coupled to the lid upper portion 22 to define a bottom surface of the lid 20. The lid handle 13 may be inserted and mounted in an opened center of each of the lid upper portion 22 and the lid lower portion 23 and may be provided detachably. Thus, in a state in which the lid handle 13 is separated, food may be added or accessible to the inner space 101 of the jar 10.

In addition, a lid gasket 24 that is in contact with the inner surface of the jar 10 to seal the inside of the jar 10 may be provided around the lid 20. Thus, the lid 20 may be inserted through the opened top surface of the jar 10, and the lid gasket 24 may be in contact with the inclined surface 122 of the jar while the lid 20 is mounted to maintain the sealing. In addition, the lid gasket 24 may be pressed and be in close contact with the inner surface of the jar 10 to prevent the lid 20 from being unintentionally separated from the jar 10.

A handle portion 221 may be further disposed on an outer end of the upper lid 22. The handle portion 221 has a shape in which a portion of the upper lid 22 protrudes upward so that the user holds the handle portion 221 by hands and may be spaced apart from the lower lid 23 to provide a space for a finger to be inserted. Thus, when the lid handle 21 is not used, or the lid handle 21 is separated, the user may easily separate the lid 20 by holding the handle portion 221.

[Structure of Body]

Hereinafter, the structure of the body 30 will be described in detail with reference to the drawings.

Figure 7:
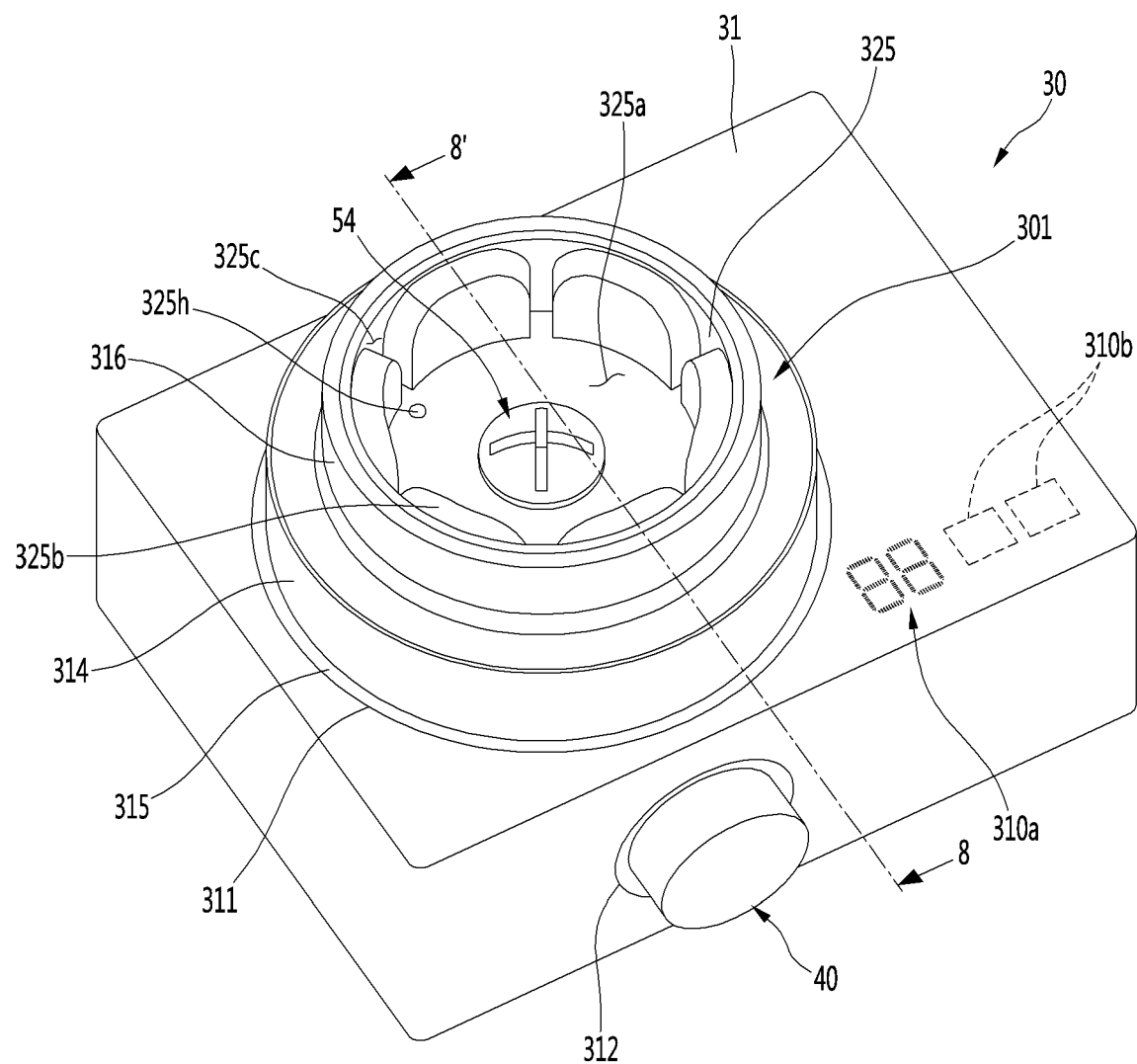
FIG. 7 is a perspective view of a body that is one component of the blender.
Figure 8:
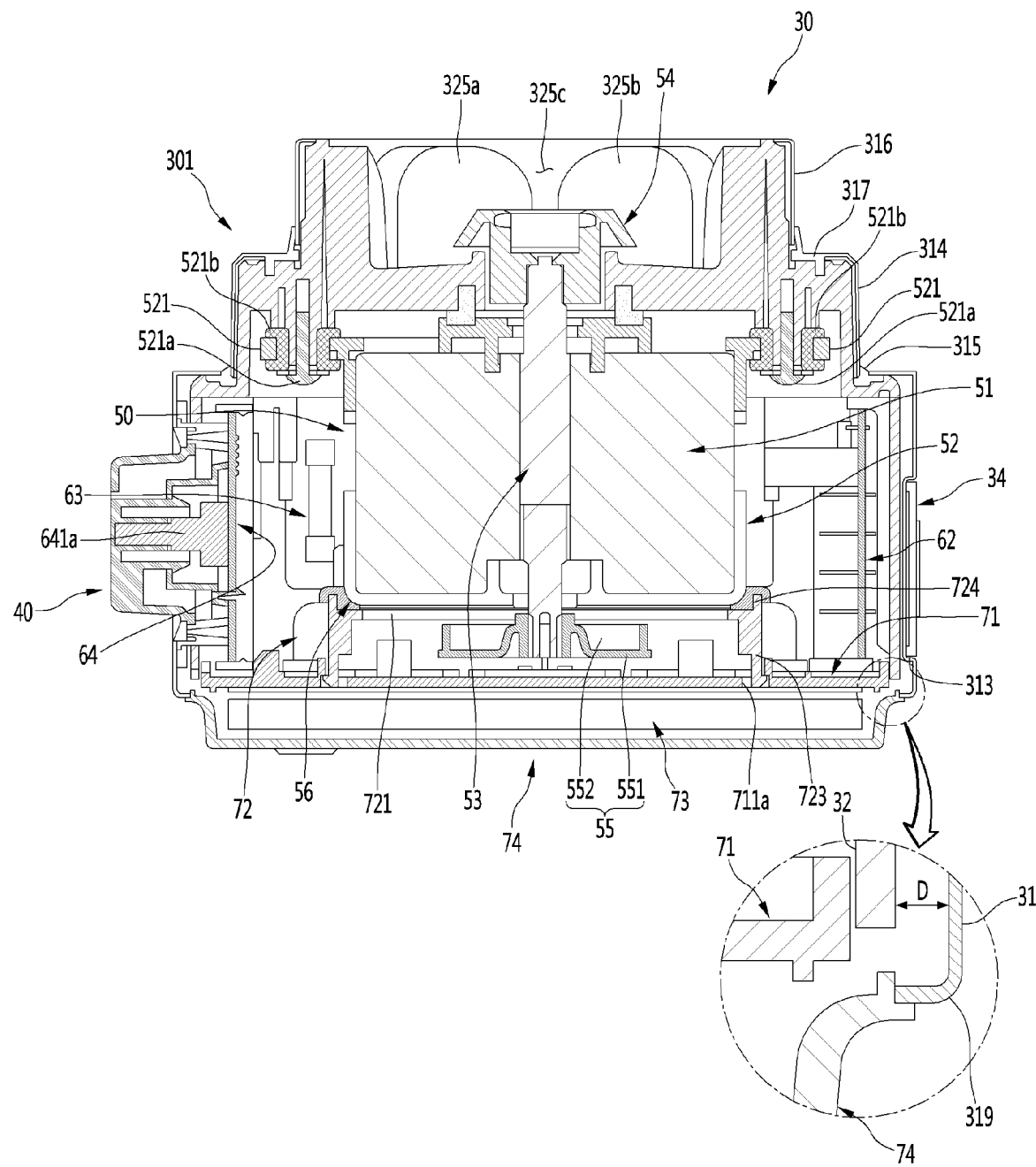
FIG. 8 is a cross-sectional view taken along line 8-8' of FIG. 7.
Figure 9:
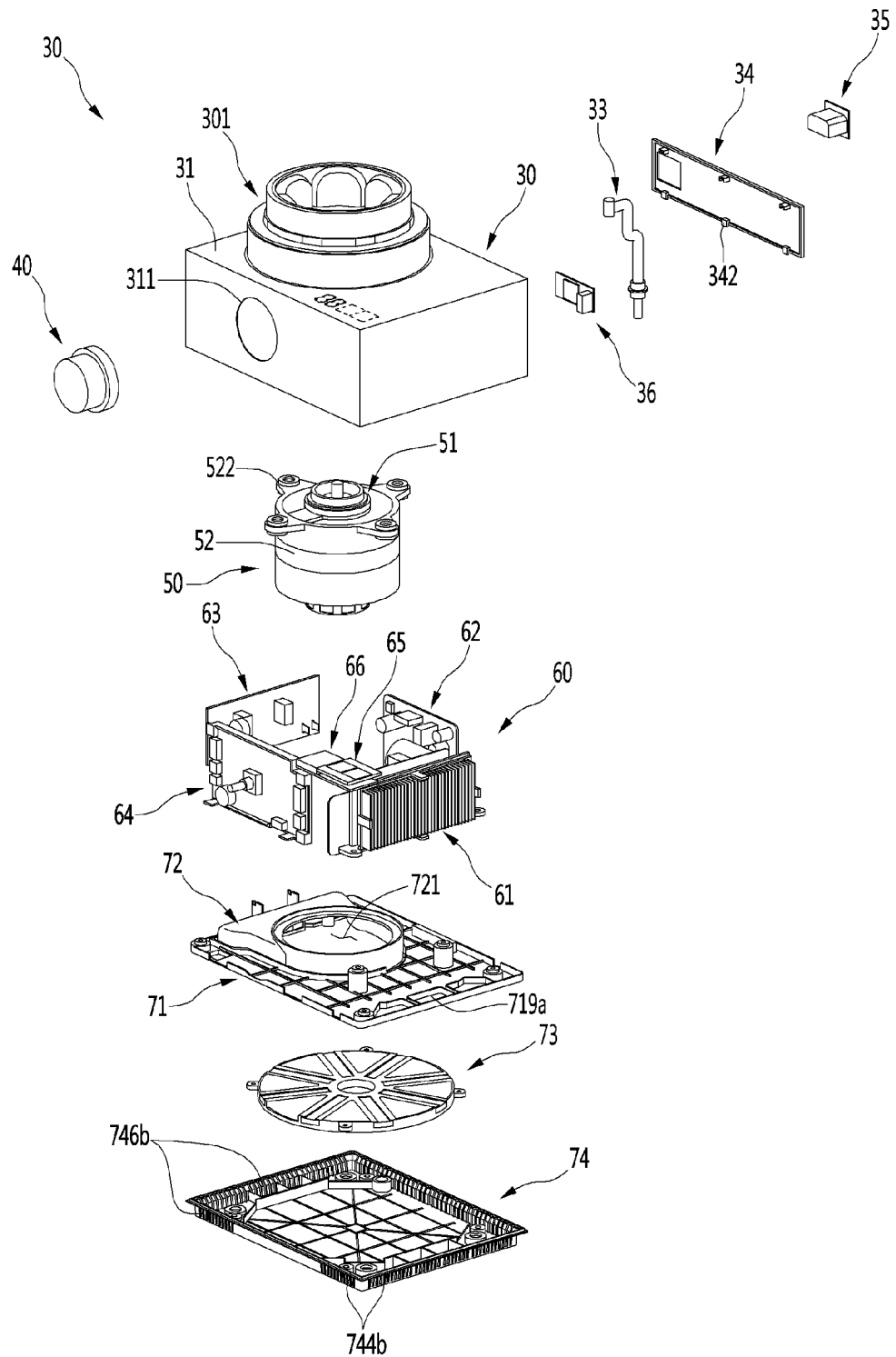
FIG. 9 is an exploded perspective view of the body when viewed from above.
Figure 10:
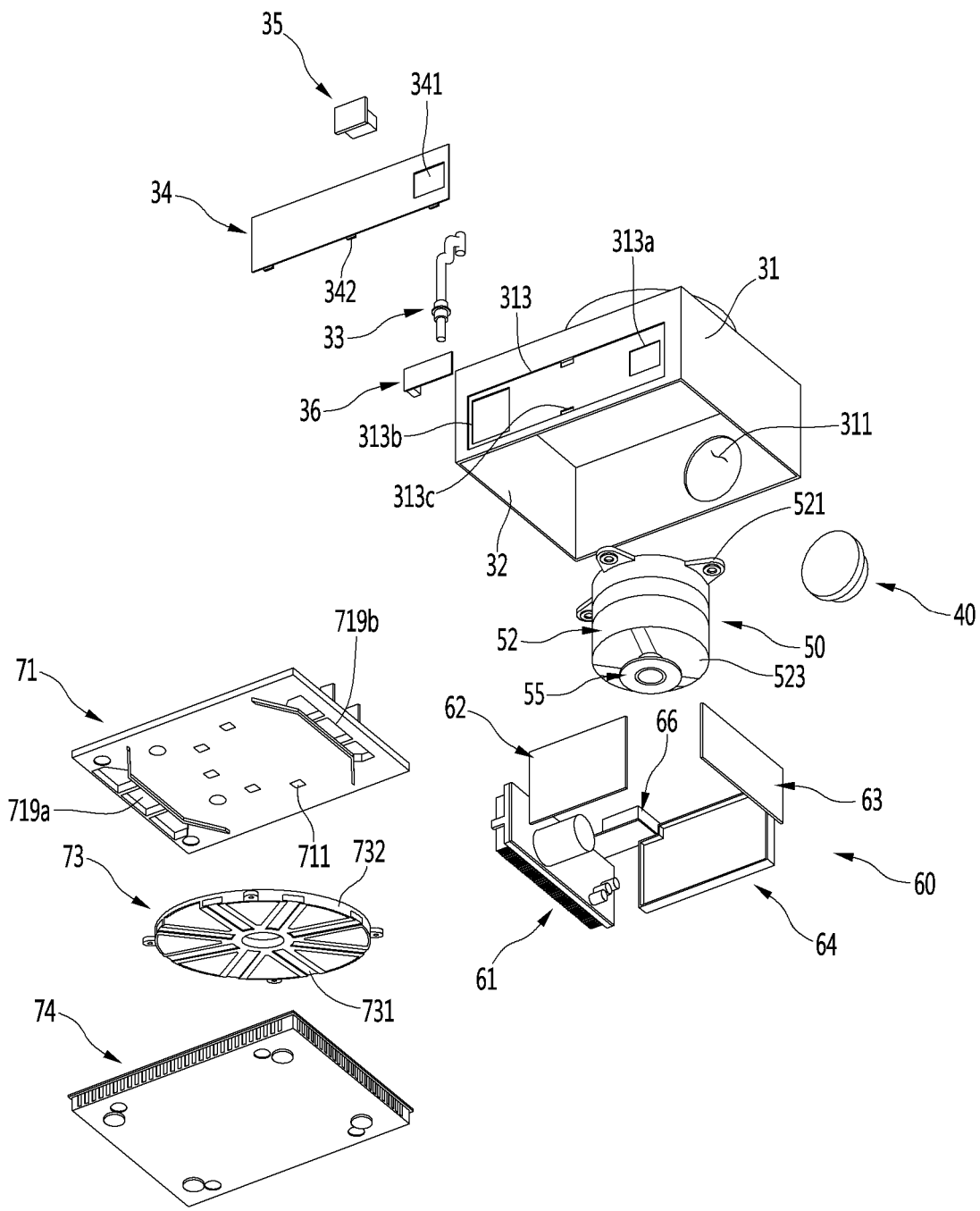
FIG. 10 is an exploded perspective view of the body when viewed from below.
Figure 11:
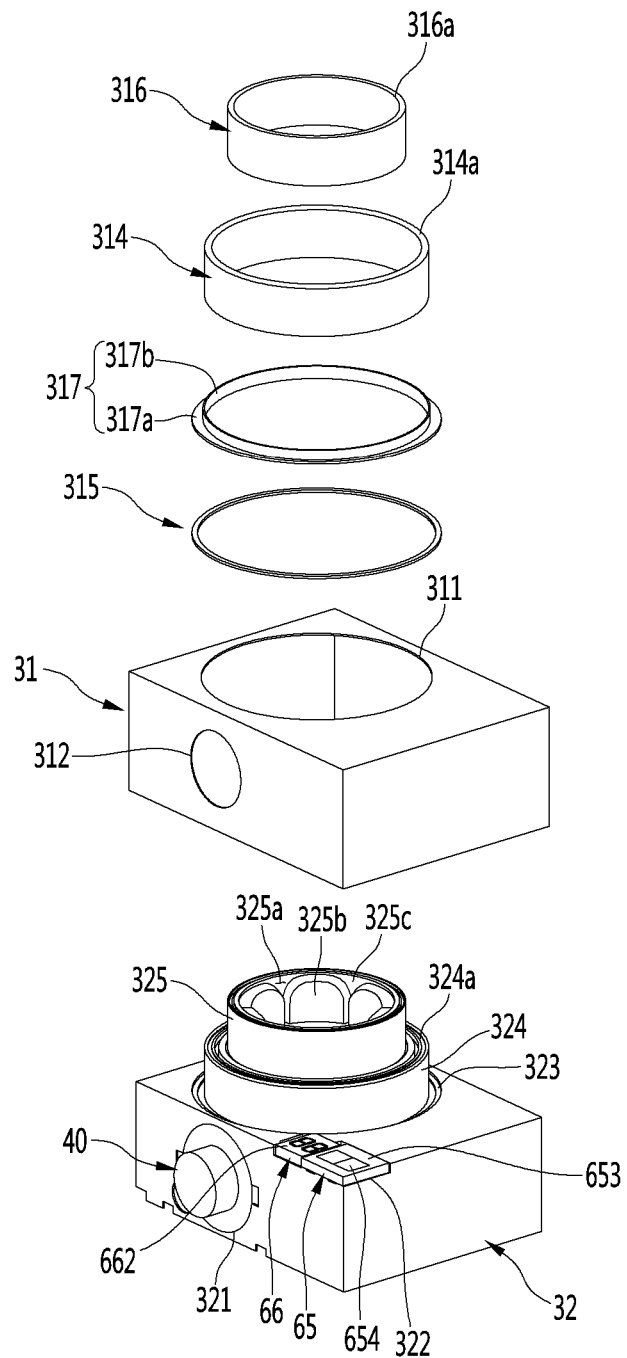
FIG. 11 is an exploded perspective view of constituents defining an outer appearance of the body.
Figure 12:
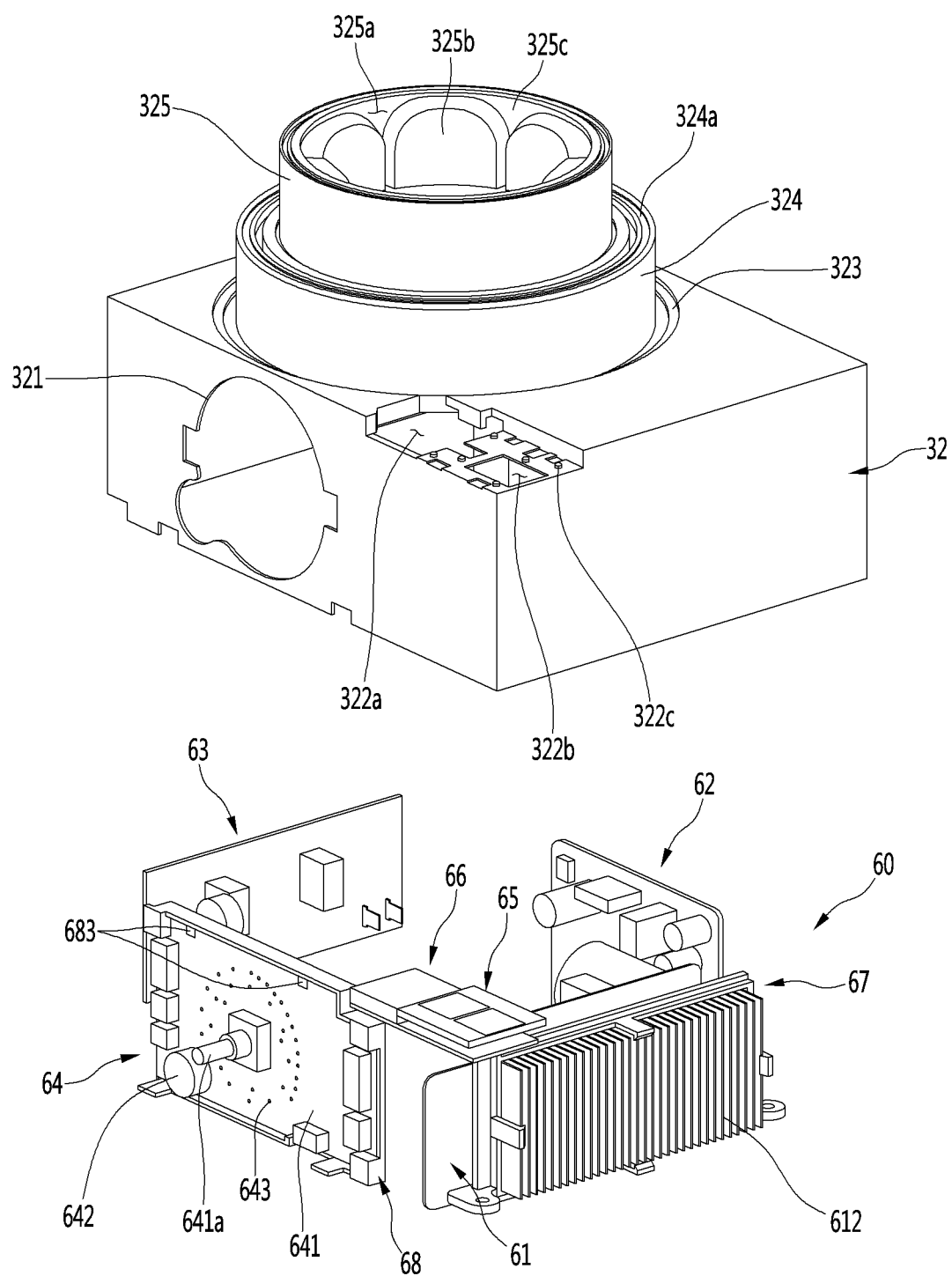
FIG. 12 is an exploded perspective illustrating an arrangement relationship between an inner case, which is one component of the body, and a PCB modules.
Figure 13:
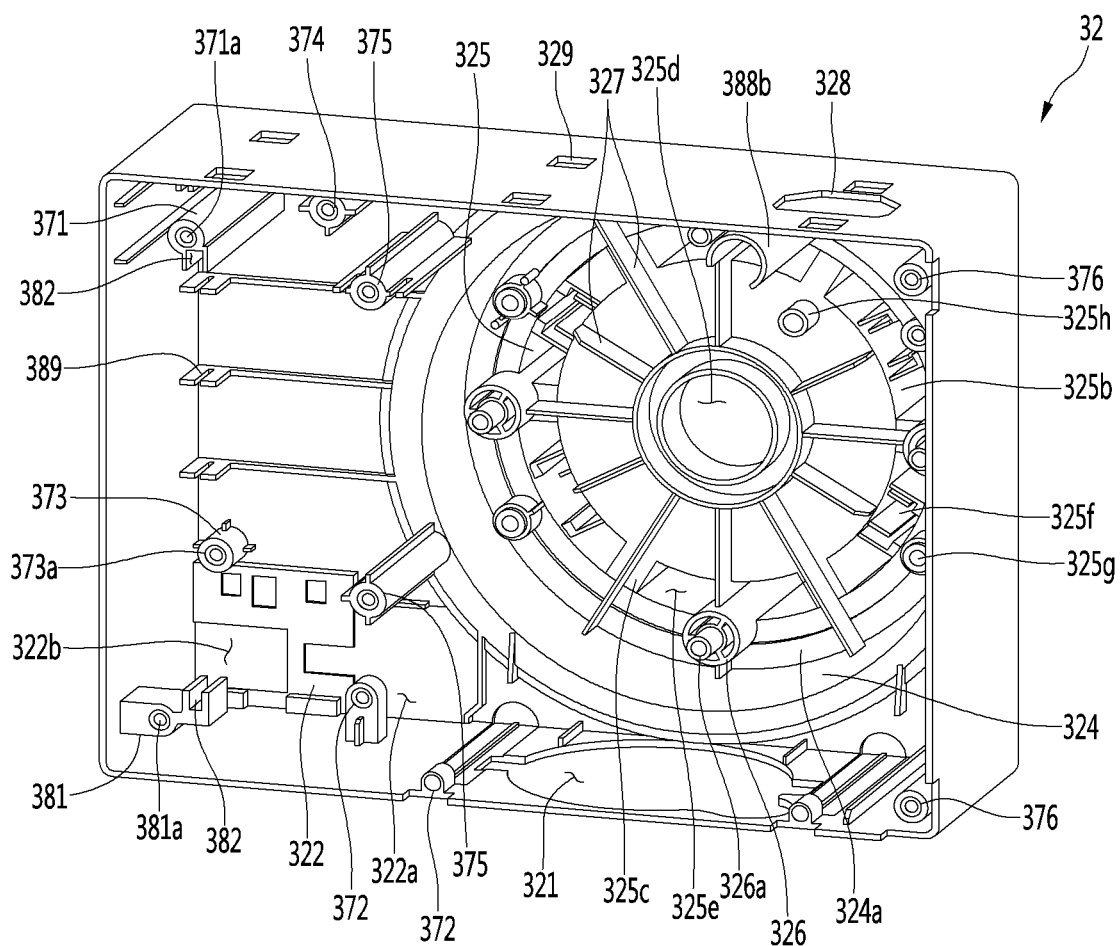
FIG. 13 is a perspective view illustrating the inside of the inner case when viewed in one direction.
Figure 14:
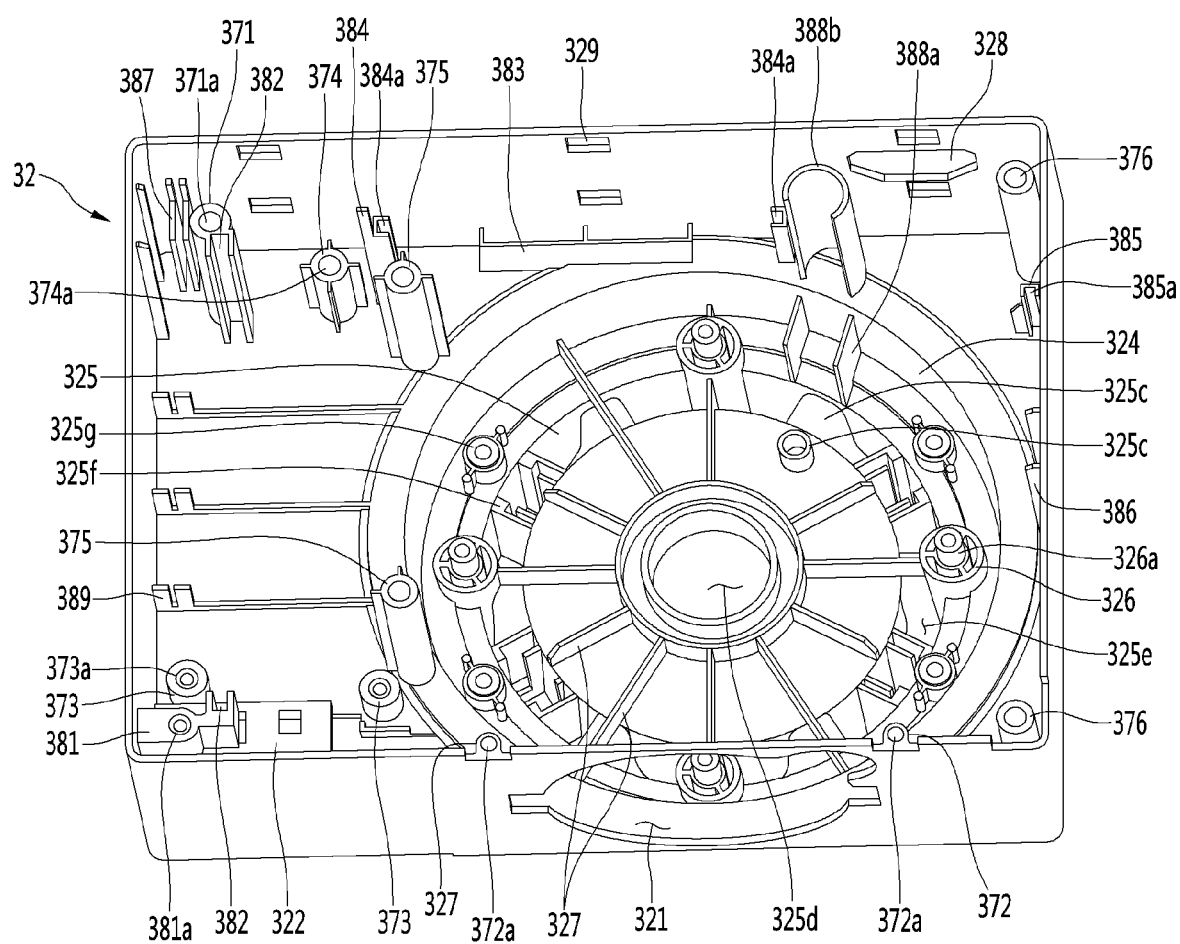
FIG. 14 is a perspective view illustrating the inside of the inner case when viewed in the other direction.

FIG. 7 is a perspective view of the body that is one component of the blender. Also, FIG. 8 is a cross-sectional view taken along line 8-8' of FIG. 7. Also, FIG. 9 is an exploded perspective view of the body when viewed from above. Also, FIG. 10 is an exploded perspective view of the body when viewed from below. Also, FIG. 11 is an exploded perspective view of constituents defining an outer appearance of the body. Also, FIG. 12 is an exploded perspective illustrating an arrangement relationship between the inner case, which is one component of the body, and the PCB modules. Also, FIG. 13 is a perspective view illustrating the inside of the inner case when viewed in one direction. Also, FIG. 14 is a perspective view illustrating the inside of the inner case when viewed in the other direction.

As illustrated in the drawings, the body 30 may be provided in a rectangular parallelepiped box shape and may have a structure in which the seating portion 301 for seating the jar 10 protrudes from the top surface of the body 30, and the knob 40 for manipulating the operation of the blender 1 is disposed on the front surface of the body 30.

Also, the inner and overall structure of the body 30 may be defined by the inner case 32, and the outer case 31 may be mounted on the outside of the inner case 32 to define the outer appearance of the body 30. For this, the inner case 32 may be injected with a plastic material to provide a structure in which the internal and external components of the body 30 are mounted. In addition, the outer case 31 may be made of a metal material such as stainless steel, and a plate-shaped material may be bent and bonded to provide a very clean and solid appearance.

Each of the outer case 31 and the inner case 32 may have an open bottom surface, and the motor assembly 50 and the plurality of PCB modules 60 may be disposed inside the outer case 31 and the inner case 32. In addition, the opened bottom surface of the inner case 32 may be shielded by the base plate 71, and the bottom surface of the body 30 may be defined by the bottom cover 74.

Referring to the structure of the body 30 in more detail, the outer case 31 may include a rectangular top surface, and front and rear surfaces and left and right surfaces, which extend downward along a circumference of the top surface.

A top surface opening 311 may be defined in a top surface of the outer case 31. The top surface opening 311 may have a diameter equal to or slightly greater than an outer diameter of the seating portion 301. Thus, when the inner case 32 and the outer case 31 are coupled to each other, the upper portion of the inner case 32 defining the seating portion 301 may pass through the top surface opening 311 and then be exposed to the outer case 31.

A first seating portion decor 314, a second seating portion decor 316, a lower decor 315, and a connection decor 317 may be mounted on an upper portion of the inner case 32 protruding to the outside of the outer case 31. An overall outer appearance of the seating portion 301 may be defined by the first seating portion decor 314, the second seating portion decor 316, the lower decor 315, and the connection decor 317. The first seating portion decor 314 and the second seating portion decor 316 may be made of the same material as the outer case 31 or a material having the same texture as the outer case 31.

Each of the first seating portion decor 314 and the second seating portion decor 316 may be provided in a ring shape having a predetermined height. The first seating portion decor 314 may have a diameter greater than that of the second seating portion decor 316, and the connection decor 317 may be provided in a ring shape that connects an upper end of the first seating portion decor 314 to the second seating portion decor 316.

In addition, the first seating portion decor 314, the second seating portion decor 316, and the connection decor 317 may be mounted on outer surfaces of a first seating portion 324 and a second seating portion, which are disposed on the inner case 32, and a top surface of the first seating portion 324, respectively.

In detail, the first seating portion 324 protruding upward from the top surface opening 311 may be disposed on the top surface of the inner case 32. The first seating portion 324 may have an outer diameter that is the same as or slightly less than a diameter of the top surface opening 311. The first seating portion 324 may extend vertically upward from the top surface of the inner case 32, and the first seating portion decor 314 may be mounted along the first seating portion 324.

A lower decor mounting portion 323 may be disposed on the top surface of the inner case 32 that is in contact with a lower end of the first seating portion 324. The lower decor mounting portion 323 may be disposed along a circumference of the first seating portion 324 so that the lower decor 315 is mounted thereon.

The lower decor 315 may be made of a plastic or rubber material and may be provided in a ring shape. In addition, when the first seating portion decor 314 is mounted, a space between the first seating portion decor 314 and the outer case 31 may be filled so that the gap is not visible. That is, the gap between a lower end of the second seating portion decor 316 made of a metal material and a circumference of the top surface opening 311 may be sealed to define a portion of the outer appearance.

The second seating portion 325 may be disposed on a top surface of the first seating portion 324. The second seating portion 325 may have an outer diameter less than that of the first seating portion 324. In addition, a connection decor mounting portion may be disposed on the top surface of the first seating portion 324. The connection decor mounting portion 324a may be disposed along a circumference of a lower end of the second seating portion 325 and may be disposed on the top surface of the first seating portion 324.

The connection decor 317 may be mounted on the connection decor mounting portion 324a. The connection decor 317 may connect an upper end of the first seating portion decor 314 to a lower end of the second seating portion decor 316 and may be provided in a ring shape having a predetermined width. That is, the connection decor 317 may define the top surface of the first seating portion 324 and also define an outer appearance between the first seating portion decor 314 and the second seating portion decor 316.

The connection decor 317 may be constituted by a horizontal portion 317a and a vertical portion 317b. The horizontal portion 317a may have a width corresponding to that of the connection decor mounting portion 324a. Also, a lower end of the horizontal portion 317a may protrude downward to be inserted into a groove of the connection decor mounting portion 324a. In addition, a top surface of the horizontal portion 317a may define an outer appearance of the top surface of the first seating portion.

The vertical portion 317b may extend vertically upward along an inner end of the horizontal portion 317a. In addition, the vertical portion 317b may cover the lower end of the second seating portion decor 316. Thus, the first seating portion decor 314 and the second seating portion decor 316 may be connected to each other by the connection decor 317, and simultaneously, a surface on which the jar 10 is seated may be formed thereon. In addition, the connection decor 317 may be in contact with the lower end of the jar 10 when the jar 10 is mounted on the seating portion 301. Thus, the connection decor 317 may be preferably made of a plastic or rubber material rather than a metal material.

The second seating portion 325 may extend upward from the top surface of the first seating portion 324, and an insertion space 325a into which a jar coupling portion (not shown) disposed on an outer surface of the blade module mounting portion 103 is accommodated may be defined in the second seating portion 325. A jar coupling protrusion 325b and a jar coupling groove 325c, which are coupled to the jar coupling portion protruding from the bottom surface of the jar 10 may be provided on an inner surface of the insertion space 325a. In addition, a plurality of the jar coupling protrusions 325b and the jar coupling grooves 325c may be continuously disposed along the inner surface of the second seating portion 325. Therefore, when the jar 10 is mounted on the seating portion 301, the jar coupling portion may be fixedly mounted in place by the mating with the jar coupling protrusion 325b and the jar coupling groove 325c.

In addition, a knob hole 312 in which the knob 40 is disposed may be defined in the front surface of the outer case 31. The knob 40 may protrude forward from the body 30 through the knob hole 312.

In addition, a plate groove 313 recessed to accommodate the rear plate 34 may be defined in the rear surface of the outer case 31. In addition, a rear opening 313b for more effective transmission of a communication signal of the communication module 36 may be defined in the plate groove 313. In addition, a plate mounting hole 313c in which the rear plate 34 is mounted may be further defined in the plate groove 313. The communication module 36 may be mounted inside the inner case 32 corresponding to the rear opening 313b. The rear plate 34 may be made of a plastic material rather than a metal, and thus electric waves transmitted and received by the communication module 36 may more easily pass. In addition, a connector hole 313a in which the power connector 35 for supplying power to the body 30 is mounted may be defined in the plate groove 313.

The rear plate 34 may be provided in a plate shape having a size corresponding to that of the plate groove 313 and may be mounted to shield the inside of the plate groove 313. A plate opening 341 may be defined in a position of the rear plate 34, which corresponds to the connector hole 313a, and the power connector 35 may be mounted in the plate opening 341. That is, the power connector 35 may be mounted in the plate groove 313 while being fixed to the plate opening 341 and may pass through the connector hole 313a and then be inserted into the body 30. In addition, plate mounting protrusions 342 coupled to the plurality of plate mounting holes 313c may be disposed around the rear plate 34. Thus, the rear plate 34 may be mounted in the plate groove 313 at the outside of the outer case 31.

The inner case 32 may be provided in a box shape with an opened bottom surface, and the seating portion 301 may be disposed on the top surface of the inner case 32. The inner case 32 may be constituted by a top surface having a planar shape as a whole, front and rear surfaces vertically extending downward along a circumference of the top surface, and left and right surfaces. The inner case 32 may be made of a plastic material to be molded to a relatively complex shape and may provide a structure for mounting the motor assembly 50 and the PCB module 60 therein.

A knob mounting hole 321 may be defined in the front surface of the inner case 32. The knob mounting hole 321 may be opened so that the knob 40 is disposed while being mounted on the main PCB module 64 and may be defined behind the knob hole 312.

A top surface mounting portion 322 may be disposed on the top surface of the inner case 32. The top surface mounting portion 322 may be recessed so that the display module 66 and the touch module 65 are mounted, and the top surface mounting portion 322 may be disposed. The top surface mounting portion 322 may be provided to be stepped and be shielded by the outer case 31 in a state in which the display module 66 and the touch module 65 are mounted.

The top surface mounting portion 322 may be disposed on an area of the top surface of the inner case 32, which includes corners of the front surface and the right surface of the inner case 32. In addition, the display module 66 and the touch module 65 may be disposed side by side while being mounted on the top surface mounting portion 322.

The display module 66 may be provided at a position including a bottom surface or a lower side of the top surface mounting portion 322 and may pass through the inner case 32 so as to be in contact with the outer case 31. On the other hand, the touch module 65 may be supported while being seated on the top surface of the top surface mounting portion 322 and may be configured to be in close contact with the rear surface of the outer case 31 in a pressed state.

In detail, a display hole 322a and a touch hole 322b may be defined in the top surface mounting portion 322, respectively. The display hole 322a may be provided at a position corresponding to a position at which the display module 66 is mounted and may have a shape corresponding so that the light guide 662 constituting the display module 66 passes therethrough. In addition, the display PCB 661 constituting the display module 66 may be disposed below the top surface mounting portion 322.

In addition, the touch hole 322b may be defined in a side of the display hole 322a. In addition, the touch hole 322b is opened so that a connector 693 for connecting the touch module 65 to the display module 66 passes therethrough. A touch module may be disposed above the touch hole 322b, and the display PCB 661 may be disposed below the touch hole 322b. In addition, a touch support 322c may be provided on the top surface mounting portion 322 outside the touch hole 322b. The touch support 322c protrudes from a top surface of the top surface mounting portion 322 to support the touch module 65 from below. Thus, the touch module 65 may be in close contact with the rear surface of the outer case 31 to more effectively detect a touch operation of the outer case 31.

Due to this structure, when assembling the outer case 31 with the inner case 32, in a state in which the touch module 65 is attached to the inner surface of the outer case 31 in a state of being in close contact with the inner surface of the outer case 31, the inner case 32 and the outer case 31 may be coupled to each other. In addition, the display module 66 may be inserted and mounted inside the inner case 32, and simultaneously, the display module 66 and the touch module 65 may be connected to each other by the connector 693.

The top surface mounting portion 322 may be disposed at a corner of the inner case 32 to fill the corner of the inner case 32 that is stepped when the display module 66 and the touch module 65 are mounted.

When the outer case 31 and the inner case 32 are assembled, the display module 66 and the touch module 65 may be shielded by the outer case 31 while being mounted on the top surface mounting portion 322.

In addition, a display portion 310a provided in a 7-segment shape by a plurality of fine holes may be disposed in the outer case 31 corresponding to the display module 66, and light irradiated from the display module 66 may be transmitted to display operation information of the blender 1 in figures or letters.

In addition, touch manipulation portions 40 and 310b may be disposed on the top surface of the outer case 31 corresponding to the touch module 65 through printing or surface processing. Thus, the user may touch the touch manipulation portions 40 and 310b to input manipulation for the operation of the blender 1 to the touch module 65. The touch manipulation portions 40 and 310b may be provided in plurality. For example, one touch manipulation portion 40 or 310b may input start, stop, and end of the operation of the motor assembly 50. Also, the other touch manipulation portion 40 or 310b may allow the motor assembly 50 to operate while being pressed and may allow the motor assembly 50 to be stopped when it is not pressed.

Referring to FIGS. 13 and 14, looking inside the inner case 32, a bottom surface of the inner case 32 may be opened in a rectangular shape. In addition, an inner top surface of the inner case 32 may be recessed in a shape corresponding to the seating portion 301.

In addition, a seating portion hole 325d passing through the inner case 32 may be defined at a center of the insertion space 325a inside the seating portion 301. The motor-side connection portion 54 may be mounted in the seating portion hole 325d. In addition, a drain hole 325h may be defined in a bottom surface of the insertion space 325a. A drain pipe 33 to be described below may be connected to the drain hole 325h. Thus, when water or foreign substances are introduced into the insertion space 325a, the water or foreign substances may be discharged to the outside of the body 30 through the drain hole 325h and the drain pipe 33. In addition, drain pipe guides 388a and 388b in which the drain pipe 33 are accommodated may be further provided inside the inner case 32, and thus, the drain pipe 33 may be maintained at an exact mounting position by the drain pipe guides 388a and 388b.

A plurality of reinforcing ribs 327 extending radially with respect to the seating portion hole 325d may be disposed on the inner surface of the inner case 32 corresponding to the seating portion 301. The mounting portion 301 may provide structural strength by the reinforcing ribs 327. Each of the reinforcing ribs 327 may have a length extending from the seating portion hole to the first seating portion 324. In addition, each of some of the reinforcing ribs 327 may have a length extending from the seating portion hole 325d to the second seating portion 325.

A motor mounting portion 326 may be disposed at a position corresponding to the first seating portion 324 inside the inner case 32. The motor mounting portion 326 may be provided in plurality at positions that are symmetrical with respect to the seating portion hole 325d. The motor mounting portion 326 may be disposed on the reinforcing rib 327 or an end of the reinforcing rib 327.

In addition, the motor mounting portion 326 may protrude downward from a position corresponding to a top surface of the first seating portion 324 and then be coupled to a housing mounting portion 521 to be described below. The motor mounting portion 326 may be disposed at a position corresponding to the housing mounting portion 521 and may include a motor mounting boss 326a that further protrudes downward. The motor mounting boss 326a may pass through the housing mounting portion 521, and a vibration-proof member 521b made of a rubber or silicon material to damp vibration may be further provided around the motor mounting boss 326a. In addition, an upper end of the motor assembly 50 may be fixed to a bottom surface of the first seating portion 324 by a screw 521a that passes through the housing mounting portion 521 and is coupled to the motor mounting portion 326.

The housing mounting portion 521 may protrude radially to the outside, and an upper hole 522 of the top surface of the motor housing 52 may be spaced apart from the inner top surface of the body 30 in a state of being mounted on the housing mounting portion 521. That is, although the motor assembly 50 is coupled to the inside of the body 30 by the housing mounting portion 521, a space through which cooling air is smoothly introduced through the upper hole 522 may be secured. Particularly, an area of the seating portion 301 may be provided in a recessed shape so that the cooling air is smoothly introduced through the top surface of the motor housing 52.

A detection device 39 for detecting the mounting of the jar 10 may be provided inside the seating portion 301. The detection device 39 may be provided inside the second seating portion 325 to detect whether the jar 10 is mounted. The detection device 39 may be provided as, for example, a hall sensor that detects a magnet mounted on the jar 10. Thus, a magnet 151 may be disposed at a lower end of the jar 10, and the detection device 39 may be provided on the second seating portion 325, in which a lower end of the jar 10 is accommodated.

The detection device 39 may be provided in plurality to detect the mounting of the jar 10 irrespective of the mounting position of the jar 10. In addition, the plurality of the detection devices 39 may be arranged at regular intervals. Thus, the type of the jar 10 may be recognized according to the arrangement structure of the magnet 151 disposed on the jar 10, and the operation of the motor assembly 50 may be differently controlled according to the type of the jar 10.

A detection device mounting portion 325f may be disposed inside the second mounting portion 325 for mounting the detection device 39. The detection device mounting portion 325f may be disposed in a space between an outer surface of the second seating portion 325 and an inner surface of the insertion space 325a.

That is, when the second seating portion 325 is molded, a recessed space may be defined inside the inner case 32, and the detection device mounting portion 325f may be disposed inside the recessed space. In addition, the detection device 39 may be inserted into the detection device mounting portion 325*f*. In the state in which the detection device 39 is inserted into the detection device mounting portion 325*f*, the detection device 39 may be in close contact with an inner surface of the mounting portion 301. In addition, the detection device mounting portion 325*f* may be disposed at a position corresponding to the jar coupling protrusion 325*b* on the inner surface of the seating portion 301. Thus, the detection device 39 may be disposed close to the outer surface of the jar 10 to effectively detect the magnet 151 inside the jar 10.

The detection device mounting portion 325*f* may be provided in the form of a pair of plates partitioning a space between the outer surface of the recessed second seating portion 325 and the inner surface of the insertion space 325*a*, and the detection device 39 may be configured to be inserted into the detection device mounting portion 325*f* upward from below.

In addition, a detection device fixing portion 325*g* may be disposed outside the detection device mounting portion 325*f*. The detection device fixing portion 325*g* may be configured to fix and mount one side of the detection device 39 and may be disposed at a position corresponding to a top surface of the first mounting portion 324. The detection device fixing portion 325*g* may be a screw 391 coupled to one side extending outward from the detection device mounting portion 325*f* in the state in which the detection device 39 is inserted into the detection device mounting portion 325*f* so that the detection device 39 is fixed. Thus, the detection device 39 may be maintained in the fixed state inside the detection device mounting portion 325*f*.

A plurality of bosses 371, 375, and 376 may be disposed inside the inner case 32 so as to be coupled to the base plate 71. The plurality of bosses 371, 375, and 376 may extend from the inner top surface of the inner case 32 toward the opened bottom surface of the inner case 32. In addition, a screw hole through which a screw passing through the base plate 71 is coupled may be defined in each of the bosses 371, 375, and 376. Also, a PCB mounting portion may be disposed on some of the bosses 371, 375, and 376 so that a portion of the PCB module 60 is mounted to be fixed.

In detail, a first coupling boss 375 extending to the base plate 71 may be provided on an approximately intermediate area of the inner case 32 adjacent to the outside of the seating portion 301. The pair of first coupling bosses 375 may be disposed at positions that are spaced apart from each other. In addition, second coupling bosses 376 extending to the base plate 71 may be provided at both corners of the inner case 32 adjacent to the outside of the seating portion 301.

A third coupling boss 371 may be provided at a corner of the other side of the inner case 32, which faces the position at which the second coupling boss 376 is provided. In addition, a PCB fixing protrusion 381 may be disposed at a corner of one side facing the third coupling boss 371. The PCB fixing protrusion 381 may be provided in a shape different from that of the third coupling boss 371, but a screw hole may be defined in the PCB fixing protrusion 381 to provide a structure capable of being coupled to the base plate 71. That is, the base plate 71 may be fixed and coupled to the inner case 32 by the first coupling boss 375, the second coupling boss 376, the third coupling boss 371, and the PCB fixing protrusion 381, and the components inside the body 30 may be maintained in the mounted state.

The knob mounting hole 321 may be defined in a front surface of the inner case 32. In addition, a plate coupling hole 329 in which the rear plate 34 is mounted may be defined in the rear surface of the inner case 32. A plurality of plate mounting protrusions 342 disposed on the rear plate 34 may sequentially pass through the plate mounting hole 313*c* and the plate coupling hole 329, which are defined in the outer case 31 so as to be coupled to the inner case 32. In addition, the connector hole 313*a* through which the power connector 35 passes may be defined in the rear surface of the inner case 32.

The motor assembly 50 may be provided in the inner space of the inner case 32. The motor assembly 50 may be configured for the rotation of the blade module 14 and may be disposed below a central portion of the seating portion 301.

The motor assembly 50 may include a motor 51 including a motor shaft 53 extending in a vertical direction, a motor housing 52 in which the motor 51 is accommodated, a motor-side connection portion 54 provided on an upper end of the motor shaft 53, and a cooling fan 55 provided on a lower end of the motor shaft 53.

In detail, the motor 51 may be provided in a general motor structure, but the motor shaft 53 serving as a rotation axis of the motor 51 may be configured to protrude and pass through the motor 51 in the vertical direction.

The motor housing 52 may be provided to surround and accommodate the motor 51. In addition, the upper and lower ends of the motor shaft 53 may pass through the motor housing 52 to protrude upward and downward.

In addition, a housing upper hole (or first motor housing hole)_522 and a housing lower hole (or second motor housing hole)_523 may be defined in the upper and bottom surfaces of the motor housing 52, respectively. The housing upper hole 522 may be provided in plurality, which are radially opened in a top surface of the motor housing 52 so that air is introduced into the motor housing 52 by rotation of the cooling fan 55.

In addition, the housing lower hole 523 may be provided in plurality, which are radially defined in a bottom surface of the motor housing 52 so that air is introduced into the motor housing 52, and then, the air cooling the motor 51 is discharged to the outside of the motor housing 52.

That is, the motor housing 52 may be provided in a structure in which a remaining portion except for the housing upper hole 522 and the housing lower hole 523 are sealed. Thus, the air for cooling the motor may be introduced into the motor housing 52 to cool the motor 51 and then be discharged to the outside of the motor housing 52.

The upper hole 522 may be defined above the motor 51 inside the motor housing 52, and the lower hole 523 may be defined below the motor 51. Thus, the air introduced into the upper hole 522 may completely cool the motor assembly 50 while being discharged through the lower hole 523.

A housing mounting portion (or housing mounting surface) 521 for fixing and mounting the motor assembly 50 in the inner case 32 may be disposed on the top surface of the motor housing 52. The housing mounting portion 521 may extend and protrude outward from an upper end of the motor housing 52, and a coupling hole to which the screw 521 is coupled may be defined. In addition, the vibration-proof member 521*b* may be provided inside the coupling hole. In addition, the housing mounting portion 521 may be provided to be symmetrical with respect to a central portion of the motor housing 52, and a plurality of housing mounting portions 521 may be disposed at regular intervals along a circumference of the motor housing 52.

A motor-side connection portion 54 coupled to a blade-side connection portion 144 may be provided at the upper end of the motor shaft 53 when the jar 10 is mounted. The motor-side connection portion 54 may be coupled to the blade-side connection portion 144 to transmit the rotational force of the motor 51. The motor-side connection portion 54 may be exposed through the top surface of the inner case 32 and may be disposed in a center of the insertion space 325*a* inside the seating portion 301. Also, the motor-side connection portion 54 is provided in a shape corresponding to the blade-side connection portion 144 *a* so as to be coupled to each other. Thus, the power of the motor 51 may be effectively transmitted to the blade module 14.

A cooling fan 55 for forcing a flow of the cooling air inside the body 30 may be provided on a lower end of the motor shaft 53. Thus, when the motor 51 rotates, the cooling fan 55 may also rotate at the same time as the blade 141 rotates.

The cooling fan 55 may be exposed to the outside of the motor housing 52 and be accommodated inside an air guide 72 to be described below. Thus, when the cooling fan 55 operates, the air passing through the motor housing 52 may be guided to the inside of the air guide 72.

The cooling fan 55 may have a structure in which a plurality of fan blades 552 are radially disposed on a top surface of the plate-shaped fan plate 551. Thus, the air introduced in an axial direction may be discharged radially so that the air effectively flows along the air guide inside the air guide 72 having a relatively narrow vertical width.

Also, a flow of air may be generated inside the body 30 according to the driving of the cooling fan 55. Particularly, at least some of the PCB modules disposed outside the motor housing 52 may be disposed in an air flow path generated by the cooling fan 55 and thus be cooled together.

The plurality of PCB modules 60 for the operation of the blender 1 may be provided inside the inner case 32. The PCB modules 60 may be disposed on the inner surfaces of the inner case 32, respectively. The PCB module 60 may be provided in plurality, which are separated from each other according to their functions, and may be arranged in parallel with a wall surface of the inner case 32 at a position adjacent to the inner surface of the inner case 32.

That is, the PCB module 60 may be disposed to surround the motor assembly 50 at the outside with respect to the motor assembly 50. Thus, when the motor assembly 50 rotates, the PCB modules 60 may be disposed in the flow path of air passing through the motor assembly 50, and thus, the PCB module 60 may be air-cooled. In addition, more effective heat dissipation or cooling may be possible by concentrating the flow of the cooling air to a PCB having a high heat generation temperature among the PCB modules 60.

In detail, the PCB module 60 may include a main PCB module 64, an inverter PCB module 61 controlling the motor 51, a power PCB module 62 controlling input power, and a filtering PCB module 63 removing noise. Of course, the PCB module 60 may further include an additional PCB module 60, or some PCB modules 60 may be omitted according to functions of the blender 1.

The main PCB module 64 may be configured to control the overall operation of the blender 1, and in particular, the knob 40 may be mounted to receive the manipulation of the knob 40. The main PCB module 64 may be mounted on the inner front surface of the inner case 32, which corresponds to a position at which the knob 40 is mounted. The main PCB module 64 may be connected to the display module 66 and the touch module 65. Thus, the main PCB module 64 may transmit operation information of the blender 1 to the display module 66 and may receive a manipulation signal of the touch module 65 when the touch module 65 is manipulated.

The power PCB module 62 may be configured to supply power input to the inside of the blender 1 and may be mounted on the inner rear surface of the inner case 32 in which the power connector 35 is disposed. The power PCB module 62 may be generally referred to as a switching mode power supply (SMPS). The power PCB module 62 may convert the power input from the power connector 35 into a stable power state for driving the blender 1 to supply the converted power. In addition, the power PCB module 62 may receive power from the wireless power module 73 when the blender 1 is used in a wireless manner, and similarly, may convert the power into a stable power state for driving the blender 1 to supply the converted power.

The inverter PCB module 61 may be configured to control a speed of the motor 51 and be configured to control a rotation speed of the motor 51 to be variable according to user's manipulation. The inverter PCB module 61 may generate heat having a high temperature during the operation due to its operational characteristics, and thus, intensive cooling may be required. For this, the inverter PCB module 61 may be disposed on the inner surface of the inner case 32 corresponding to the plate suction hole 719*a* to perform the intensive cooling. The inverter PCB module 61 will be described in more detail below.

The filtering PCB module 63 may be connected to the power PCB module 62 and be configured to remove noise on a power frequency output from the power PCB module 62. In addition, the filtering PCB module 63 may be provided at one side of the inner surface of the inner case 32 facing the inverter PCB 611.

As described above, the main PCB module 64 and the power PCB module 62, and the inverter PCB module 61 and the filtering PCB module 63 may be disposed at positions facing each other. That is, the PCB modules 60 may be disposed to surround the motor assembly 50 on four sides of front, rear, left, and right sides with the motor assembly 50 at a center.

Referring to the inner structure of the inner case 32 for mounting the PCB modules 60 in more detail, a main PCB mounting portion 372 on which the main PCB module 64 is mounted may be disposed on the front side of the inner case 32.

The main PCB mounting portion 372 may be disposed at both left and right sides with respect to the knob mounting hole 321 and may protrude inward from the front lower end of the inner case 32. In addition, a screw hole a may be defined in an end of the main PCB mounting portion 372, and thus, a screw for fixing a main bracket 68, which is one component of the main PCB module 64, may be coupled.

Thus, the main PCB module 64 may be maintained in a stable fixed state without moving in a front and rear direction on the front surface of the inner case 32. Particularly, even when the knob 40 is repeatedly manipulated, the fixed state may be maintained, and the main PCB module 64 may not move or deviate from its original position.

In addition, power PCB mounting portions 383 and 384 on which the power PCB module 62 is mounted may be disposed on the rear surface of the inner case 32 or the inside of the inner case 32, which is adjacent to the rear surface of the inner case 32. The power PCB mounting portions 383 and 384 may include a power PCB side mounting portion 384 and a power PCB upper mounting portion 383 disposed on the inner top surface of the inner case, which are disposed to be spaced apart from each other in the left and right direction.

The power PCB side mounting portion 384 may be configured to restrict both ends of the left and right sides of the power PCB module 62, and slots 384a into which both ends of a substrate constituting the power PCB module 62 are inserted may be defined in the power PCB side mounting portion. The power PCB side mounting portion 384 may extend vertically downward from the inner top surface of the inner case 32. In addition, the slots 384a may be provided in the power PCB side mounting portions 384 disposed at both sides in a direction facing each other. Thus, the power PCB module 62 may be slidably inserted into the power PCB side mounting portion 384 upward from the lower side.

The power PCB upper mounting portion 383 may protrude from the inner top surface of the inner case 32 and may be provided to be long between the pair of the power PCB side mounting portions 384. In addition, a slot may be also defined in a protruding end of the power PCB upper mounting portion 383 so that the upper end of the substrate of the power PCB module 62 is inserted.

When the base plate 71 is mounted, a power PCB lower restriction portion 718b restricting the lower end of the power PCB module 62 may be further disposed at one side of the top surface of the base plate 71. Thus, the power PCB module 62 may be mounted inside the body 30 in the restricted state.

The communication module 36 may be mounted at one side on which the power PCB module 62 is mounted. The communication module 36 may be configured to communicate between the blender 1 and other devices and may be disposed at a position corresponding to the rear opening 313b. Thus, a communication signal may be transmitted by pass through the inner case 32 and the rear plate 34, each of which is a plastic material, so that the blander 1 and other devices communicate with each other.

Communication module mounting portions 374 and 387 may be disposed at one side of the inner case 32 mounting the communication module 36. The communication module mounting portions 374 and 387 may be disposed at one side of the inner rear surface of the inner case 32. That is, the power connector 35 may be disposed at one side, and the communication module 36 may be disposed at the other side with respect to the power PCB module 62.

The communication module mounting portions 374 and 387 may include a communication module mounting boss 374 and a communication module supporting portion 387. The communication module mounting boss 374 may extend downward from the inner top surface of the inner case 32, and a screw hole 374a may be defined in the extension end. Thus, a screw passing through one side of the communication module 36 may be coupled to the communication module mounting boss 374 to fix the communication module 36.

In addition, the communication module support 387 may protrude from the inner rear surface of the inner case 32 to support the communication module 36. Thus, the communication module 36 may be maintained in the fixed mounting state without moving inside the inner case 32.

In addition, filtering PCB mounting portions 385 and 386 on which the filtering PCB module 63 is mounted may be disposed at one side of both left and right surfaces of the inner case 32. The filtering PCB mounting portions 385 and 386 may be disposed at a position corresponding to a position, at which a plate discharge hole 719b is defined, among the left and right sides of the inner case 32.

The filtering PCB mounting portions 385 and 386 may include a filtering PCB side mounting portion 385 and a filtering PCB support 386. The filtering PCB side mounting portion 385 may be disposed to restrict both ends of the substrate of the filtering PCB module 63, and a pair of filtering PCB side mounting portions 385 may be disposed at positions spaced apart from each other. The filtering PCB side mounting portion 385 may extend vertically from the top surface of the inner surface of the inner case 32, and the pair of filtering PCB side mounting portions 385 may be provided with slots 385a opened in opposite directions to each other. Thus, the filtering PCB module 63 may also move upward from the lower side of the inner case 32 and may be inserted into the slot 385a defined in the filtering PCB side mounting portion 385.

The filtering PCB support 386 may protrude to the inside of the inner case 32 at a position corresponding to the left side (when viewed in FIG. 1) of the inner surface of the inner case 32. The filtering PCB support 386 may extend from an upper end to a lower end of the inner case 32 and may protrude to a predetermined height to support the filtering PCB module 63 from the outside.

In addition, a filtering PCB lower restriction portion 718a restricting a lower end of the filtering PCB module 63 may be further disposed on the base plate 71. Also, when the base plate 71 is coupled to the inner case 32, the filtering PCB lower restriction portion 718a may be coupled to the lower end of the PCB module 60 so that the PCB module 60 is coupled to a separate screw. Thus, the PCB module 60 may be firmly and fixed and coupled without being coupled to the separate screw.

The inverter PCB mounting portions 371 and 381 may be provided at the other side of the inner left and right sides of the inner case 32 facing the filtering PCB module 63. The inverter PCB mounting portions 371 and 381 may be disposed above the plate suction hole 719a, and the inverter PCB module 61 may be disposed vertically above the plate suction hole 719a.

The inverter PCB mounting portions 371 and 381 may include the third coupling boss 371 and the PCB fixing protrusion 381. That is, screw holes 371a and 381a may be defined in an upper end of the third coupling boss 371 and an upper end of the PCB fixing protrusion 381, and a screw passing through the inverter PCB module 61 may be coupled to fix the inverter PCB module 61.

In addition, inverter PCB slots 382 may be defined in the third coupling boss 371 and the PCB fixing protrusion 381, respectively. The pair of inverter PCB slots 382 may be disposed in a direction facing each other to restrict both ends of the inverter PCB module 61.

The inverter PCB mounting portions 371 and 381 may include an inverter upper support 389. The inverter upper support 389 may be disposed on a top surface of the inner surface and the corners of one surface of the inner case 32 and may protrude to support the top surface of the inverter PCB module 61.

The PCB fixing protrusion 381 may protrude from an inner sidewall of the inner case 32. The PCB fixing protrusion 381 may be disposed at a position corresponding to the position of each of the display module 66 and the touch module 65. Thus, the PCB fixing protrusion 381 may be disposed further below the top surface mounting portion 322 so as not to interfere with the display module 66 and the touch module 65, which are mounted on the inner top surface of the inner case 32 and also have a structure that protrudes from the sidewall of the inner case 32. A protrusion length of the PCB fixing protrusion 381 may extend to a position corresponding to the inverter PCB slot 382 of the third coupling boss 371.

In addition, a manipulation portion mounting boss 373 for fixing and mounting the display module 66 and the touch module 65 may be disposed outside the top surface mounting portion 322. The manipulation portion mounting boss 373 may protrude downward from the inner top surface of the inner case 32, and a hole 373a through which a screw is coupled may be defined in the protruding end.

A base plate 71 may be provided on a lower end of the inner case 32. The base plate 71 may shield the opened bottom surface of the inner case 32 and may support some of the inner components of the inner case 32.

The base plate 71 may be provided in a plate shape and may be provided in a shape corresponding to the opened bottom surface of the inner case 32. In addition, a circumference of the base plate 71 may be coupled to the lower end of the inner case 32, and a space between the circumference of the base plate 71 and the lower end of the inner case 32 may be sealed.

In addition, a plate suction hole (or first plate hole) 719a and a plate discharge hole (or second plate hole) 719b may be defined in both left and right sides of the base plate 71, respectively. The plate suction hole 719a is defined along one end of the base plate 71 and may provide a passage through which air for cooling is introduced into the inner case 32 when the motor assembly 50 is driven. The plate discharge hole 719b may be defined along the other end of the base plate 71 and provide a passage through which the cooling air inside the inner case 32 is discharged to the outside of the inner case 32.

An air guide 72 may be disposed on the top surface of the base plate 71. The air guide 72 may be provided below the motor assembly 50 to connect the plate discharge hole 719b in the housing lower hole 523, thereby guiding the discharge of the air cooling the motor while passing through the motor assembly 50. That is, the air guide 72 may define an independent air flow space form the motor assembly 50 to the discharge hole.

The air guide 72 may support the lower end of the motor housing 52 and may accommodate the cooling fan 55 therein. Thus, when the cooling fan 55 rotates, the air passing through the motor housing 52 may flow along the air guide 72.

The wireless power module 73 may be provided on a bottom surface of the base plate 71. The wireless power module 73 may be configured to supply wireless power to the blender 1 and may receive power using an induced electromotive force method. A specific structure of the wireless power module 73 will be described in more detail below.

A bottom cover 74 may be provided below the base plate 71. The bottom cover 74 may define the bottom surface of the body 30 and may shield the opened bottom surface of the outer case 31. In addition, when the wireless power module 73 is mounted on the base plate 71, the wireless power module 73 may be shielded by the bottom cover 74.

The bottom cover 74 may be provided in a plate shape having a size corresponding to that of the opened bottom surface of the outer case 31, and a circumference of the bottom cover 74 may extend upward from the outer case 31 and then be coupled to the lower end of the outer case 31. In addition, a cover suction hole 744 and a cover discharge hole 746 may be defined in the bottom cover 74, and an inflow of external air and discharge of air radiated from the inside of the body 30 may be performed through the cover suction hole 744 and the cover discharge hole 746.

The outer case 31 may be provided with a bent portion 319, of which a lower end has an inwardly bent shape, and thus be coupled to an upper end of the bottom cover 74. Thus, the lower end of the outer case 31, that is, the coupled portion between the end of the bent portion 319 and the upper end of the bottom cover 74 may be prevented from being directly seen by the user to improve the outer appearance.

In addition, the inner case 32 may be inserted through the opened bottom surface of the outer case 31, and in this case, the inner case 32 may be provided so as not to interfere with the bent lower end of the outer case 31.

That is, the inner case 32 may have a size less than that of the outer case 31. The inner case 32 may be inserted through the opened bottom surface of the outer case 31 in which the bent portion 319 is provided, and the first seating portion 324 of the inner case 32 may be disposed in the top surface opening 311 so that the inner case 32 is fixed and mounted inside the outer case 31.

A circumferential surface of the inner case 32 may be maintained by a set distance D from a circumferential surface of the outer case 31 while being mounted on the outer case 31. A gap between the circumferential surface of the inner case 32 and the circumferential surface of the outer case 31 may correspond to at least a bent width of the bent portion 319.

Although the inner case 32 has a circumferential surface spaced apart from the outer case 31, the top surfaces of the first seating portion 324 and the inner case 32 may be in close contact with the top surface of the outer case 31, and thus, the inner case 32 is maintained in the fixed state. In addition, the circumferential surface of the outer case 31 and the circumferential surface of the inner case 32 may be maintained by the set distance D.

In addition, a fixed position may be maintained by sequentially coupling the base plate 71 and the bottom cover 74. Of course, if necessary, a sound absorbing material may be filled between the inner case 32 and the outer case 31 to absorb sound and more stably fix the inner case 32.

A supporting member (or seal) 56 for supporting the motor assembly 50 from below may be provided inside the inner case 32. Also, a drain pipe 33 that connects the inside of the seating portion 301 to the base plate 71 to discharge a liquid foreign substance flowing down into the inside of the seating portion 301 to a lower side of the bottom cover 74 may be provided in the inner case 32.

[Mounting Structure of Display Module and Touch Module]

Hereinafter, the mounting structure of the display module 66 and the touch module 65 will be described in more detail with reference to the drawings.

Figure 15:
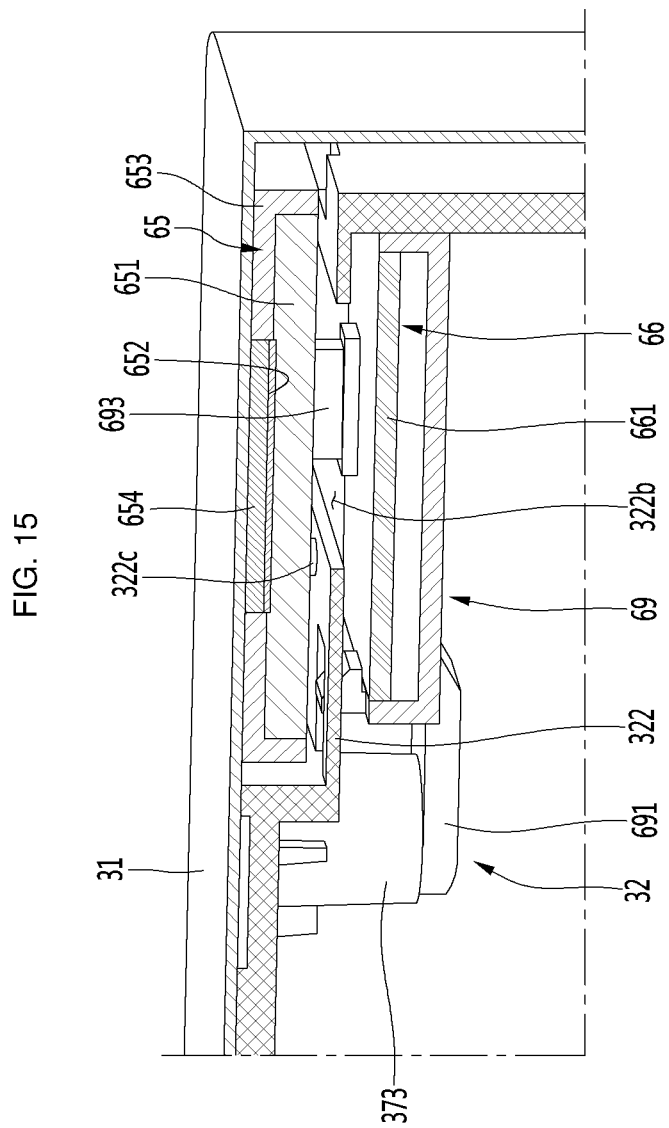
FIG. 15 is a cutaway perspective view taken along line 15-15' of FIG. 2.

FIG. 15 is a cutaway perspective view taken along line 15-15' of FIG. 2.

As illustrated in the drawing, the display module 66 and the touch module 65 may be mounted on the inner top surface of the body 30. When viewed from the outside of the body 30, the display module 66 and the touch module 65 may be disposed side by side, but in reality, the touch module 65 may be disposed above the display module and thus may be doubly arranged in the vertical direction.

In detail, the touch module 65 may include a touch PCB 651, a touch sensor 652, a touch module cover 653, and a touch booster 654. The touch sensor 652 may be mounted on a top surface of the touch PCB 651, and in this case, the touch PCB 651 may be pressed and supported by the touch support 322c on a top surface of the top surface mounting portion 322. That is, the touch module 65 may be disposed while being seated on the top surface mounting portion 322 as a whole.

In addition, the touch module cover 653 may be provided on the top surface of the touch PCB 651 to shield the touch PCB 651 and may be in close contact with the inner surface of the outer case 31. In this case, an adhesive or the like may be provided on the top surface of the touch module cover 653 so that the touch module 65 is effectively attached to the outer case 31. In addition, one side of the touch module cover 653 corresponding to the touch sensor 652 may be opened, and the touch booster 654 that transmits deformation of the outer case 31 when the outer case 31 is pushed may be provided in the opening of the touch module cover 653. The touch booster 654 may be disposed on the same extension line as the touch sensor 652 and the touch manipulation portions 40 and 310b so that the touch sensor 652 effectively detects user's manipulation on the touch manipulation portions 40 and 310b when the user manipulates the touch manipulation portions 40 and 310b.

A connector 693 extending downward through the touch hole 322b may be provided on a bottom surface of the touch PCB 651, and the connector 693 may be connected to the display PCB 661 of the display module 66.

The display module 66 may include a display PCB 661, a light guide 662, and a display module case 69. The display PCB 661 may be disposed below the top surface mounting portion 322, and a plurality of LEDs may be provided to irradiate light to the display portion 310a. Each of the LEDs may have a structure such as 7-segment.

The light guide 662 may be provided on a top surface of the display PCB 661 to guide the light emitted from the LED toward the display portion 310a of the outer case 31. The light guide 662 may extend from the display PCB 661 toward the outer case 31 and may extend to pass through a display hole 322a on the top surface mounting portion 322. Also, a top surface of the light guide 662 may be in close contact with the inner surface of the outer case 31 to prevent the light from leaking to the outside of the LED and the display portion 310a by the light guide 662 to the outside so that information is clearly displayed to the outer case 31.

The display PCB 661 may extend below the touch module 65 and thus may be connected to the connector 693. Also, the display PCB 661 may be accommodated in the module case 69, and the display module coupling portion 691 protruding from one side of the module case 69 may be screw-coupled to the manipulation portion mounting boss 373.

[Mounting Structure of PCB Modules]

Hereinafter, the mounting structure of each of the PCB modules 60 will be described in more detail with reference to the drawings.

Figure 16:
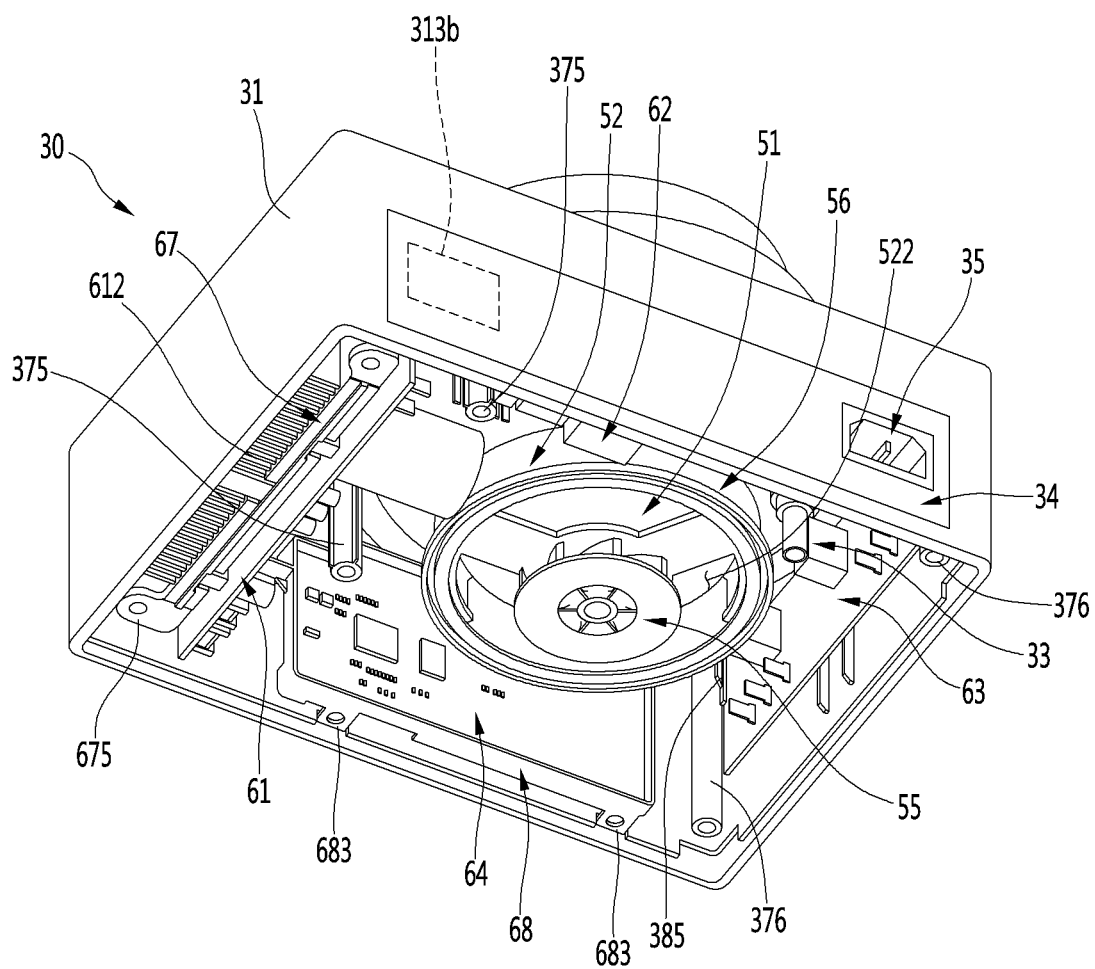
FIG. 16 is a perspective view of the body in a state in which a base plate is separated when viewed from below.
Figure 17:
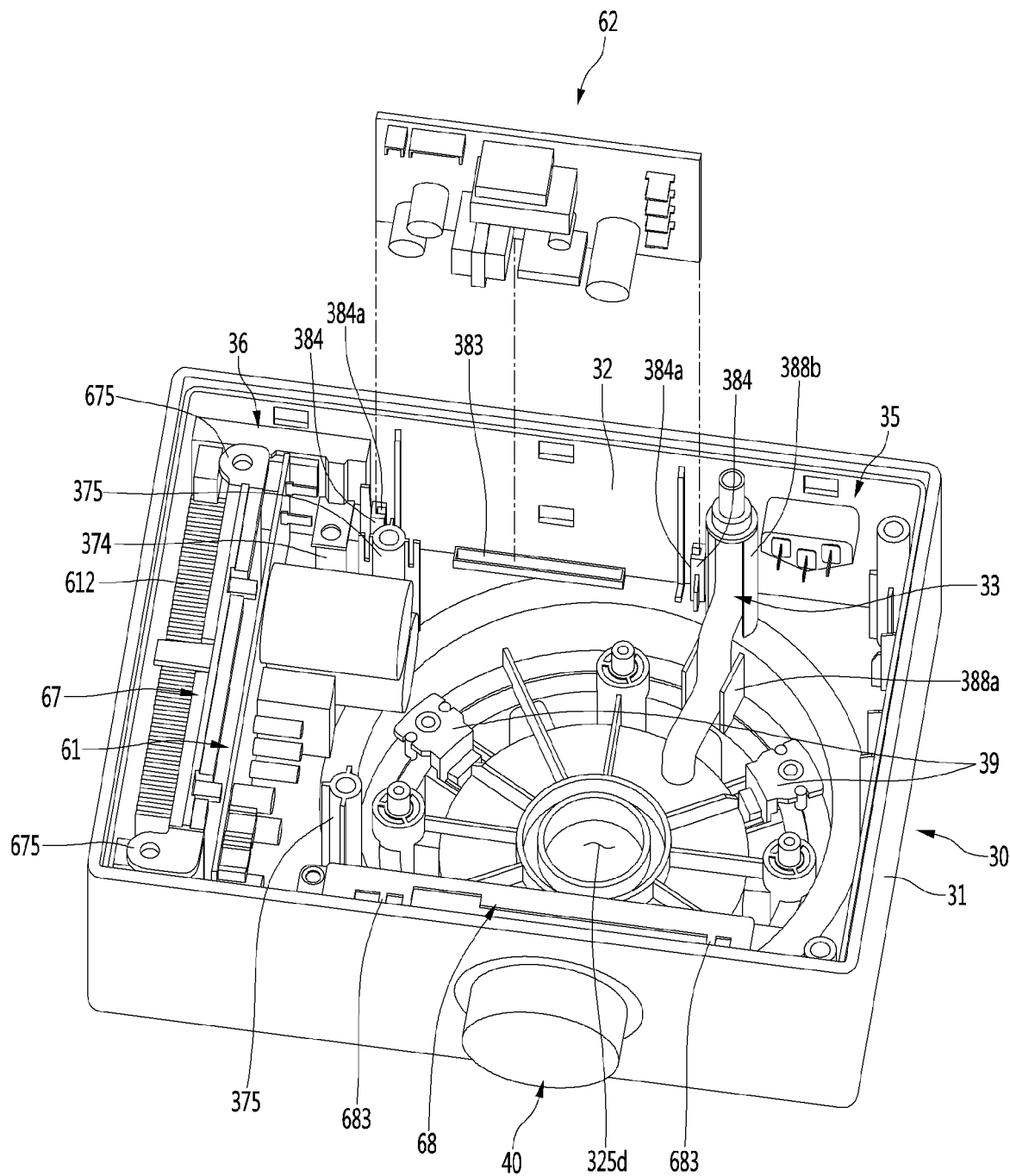
FIG. 17 is an exploded perspective view illustrating a coupling relationship between the body and the PCB module.
Figure 18:
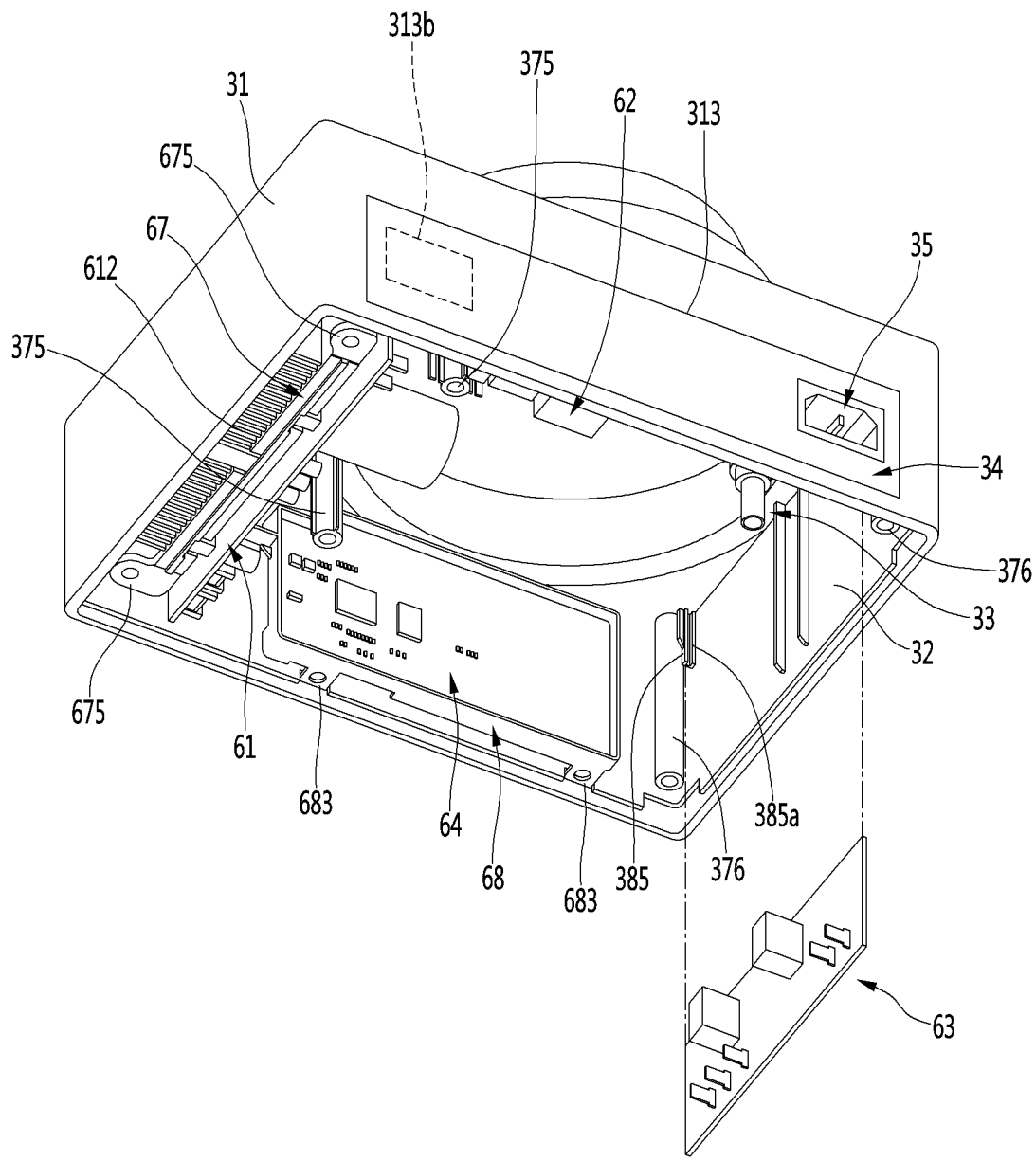
FIG. 18 is an exploded perspective view illustrating a coupling relationship between the body and the other PCB module.

FIG. 16 is a perspective view of the body in a state in which the base plate is separated when viewed from below. Also, FIG. 17 is an exploded perspective view illustrating a coupling relationship between the body and the PCB module. Also, FIG. 18 is an exploded perspective view illustrating a coupling relationship between the body and the other PCB module.

As illustrated in the drawings, the motor assembly 50 may be provided at a center of the inner space of the body 30, and the plurality of PCB modules 60 may be disposed in front, rear, left and right sides around the motor assembly 50.

All of the PCB modules 60 may be disposed parallel to an inner circumferential surface of the inner case 32 and may be separately disposed for each function and configured to be independently detachable. Therefore, it may be easy to combine the functions, and assembly and service may be easily made.

In addition, the internal components of the inner case 32 including the PCB module 60 may have a structure in which the opened bottom surface is disposed to face an upper side in a state in which the inner case 32 and the outer case 31 are assembled with each other, and then, the components disposed inside the body 30 such as the PCB module 60, the motor assembly 50, the drain pipe 33, and the detection device 39 are inserted to be mounted. For this, the body 30 may be mounted on a separate jig to maintain the state in which the opened bottom surface faces the top surface, and the internal components may be inserted through the opened bottom surface of the inner case 32.

Among the plurality of PCB modules 60, the inverter PCB module 61 may be disposed adjacent to one surface of the left and right sides of the inner case 32. The position of the inverter PCB module 61 may correspond to the upper side of the plate suction hole 719a, and in particular, the heat dissipation member (or heat sink) 612 constituting the inverter PCB module 61 may be disposed to face the inner surface of the inner case 32. Thus, the suction air may flow between the inverter PCB module 61 and the inner case 32 to dissipate heat. Since the inverter PCB module 61 has relatively large and high elements mounted on the inverter PCB 611, the inverter PCB module 61 may be disposed on a side surface that is far from the center of the seating portion 301 of the inner case 32 to prevent an interference with the motor assembly 50 from occurring.

The inverter PCB module 61 may include an inverter PCB 611, an inverter bracket 67, and a heat dissipation member 612, and the inverter bracket 67 may be mounted to the inverter PCB mounting portions 371 and 381. The structure and mounting structure of the inverter PCB module 61 will be described in more detail below.

In addition, the power PCB module 62 may be disposed at a position adjacent to the inner rear surface of the inner case 32, and the power PCB module 62 may be mounted on the power PCB mounting portions 383 and 384. The power PCB module 62 may be configured so that the substrate itself is fixedly mounted to the inner case 32 without a separate bracket.

Referring to FIG. 17 in more detail, the power PCB module 62 may be inserted into the slot 384a of the power PCB side mounting portion 384 disposed on each of both sides thereof. Both ends of the power PCB module 62 may be restricted by the slots 384a disposed on both the sides of the power PCB module 62 inserted upward from below.

Also, when the power PCB module 62 is completely inserted, the upper end of the power PCB module 62 may be supported by the power PCB upper mounting portion 383. When the base plate 71 is coupled to the inner case 32 in the above-described state, the power PCB lower restriction portion 718b may support the power PCB module 62 from below to support the power PCB module 62 to be fixed inside the inner case 32.

The communication module 36 may be further provided on the inner rear surface of the inner case 32. The communication module 36 may be constituted by a communication PCB 361 and a communication bracket 362 accommodating the communication PCB 361, and the communication bracket 362 may be screw-coupled to the communication module mounting portions 374 and 387.

In addition, the filtering PCB module 63 may be provided on one inner side of the inner case 32 facing the inverter PCB module 61. The filtering PCB module 63 may be mounted on one side of the left and right sides inside the inner case 32 without a separate bracket.

In this case, the filtering PCB module 63 may have a substrate itself mounted on the filtering PCB mounting portions 385 and 386. Looking at this in more detail, as illustrated in FIG. 18, the filtering PCB module 63 may be slidably inserted into the slot 385a defined in the pair of the filtering PCB side mounting portions 385 upward from below. Thus, both ends of the filtering PCB module may be restricted by the slots 385*a* disposed on both the sides. In addition, the filtering PCB support 386 may support the filtering PCB module 63 from the outside. In addition, the lower end of the filtering PCB module 63 may be supported by the filtering PCB lower restriction portion 718*a* when the base plate 71 is mounted, and the filtering PCB module 63 may be mounted to be fixed inside the inner case 32.

The main PCB module 64 may be mounted inside the inner case 32 adjacent to the inner front surface of the inner case 32. The main PCB module 64 may be disposed at a position corresponding to the knob hole 312 so that the knob 40 is mounted.

In addition, the main PCB module 64 may include a main PCB 641 and a main bracket 68 accommodating the main PCB 641. The main PCB 641 may be provided with a knob shaft 641*a* coupled to the knob 40. Also, components for receiving a manipulation input of the knob 40 may be disposed, and an LED 643 for irradiating light to the knob 40 or an adjacent portion at which the knob 40 is disposed may be disposed. In addition, an output means 642 such as a buzzer for notifying the blender 1 with a voice signal when power is first applied may be further provided.

A bracket coupling portion 683 protruding forward may be disposed on the top surface of the main bracket 68 and may be coupled to the main PCB mounting portion 372 disposed at the front end of the inner case 32 by a screw. Thus, even when the knob 40 is manipulated, the main PCB module 64 may be firmly fixedly mounted inside the inner case 32.

Since each of the power PCB module 62 and the filtering PCB module 63 has a small size and a structure in which a load is not applied relatively, the substrate may be directly restricted without the separate bracket and may have a simple fixing structure by the insertion. In addition, each of the power PCB module 62 and the filtering PCB module 63 may have a stably fixed structure by the inner case 32 and the base plate 71.

On the other hand, each of the case of the inverter PCB 611 and the main PCB 641 may have the relatively large size and thus may be more firmly fixed to the inner case 32 by the separate brackets 67 and 68. Particularly, the inverter PCB 611 may be disposed in the path through which air is intensively suctioned so that a load is applied during the air flow. Also, since the main PCB 641 is subjected to a load while the user directly manipulates the knob 40, it requires a structure in which the inverter PCB 611 and the main PCB 641 are fixed to the separate brackets 67 and 68, and also, a more stable fixing structure may be provided by providing the mounting structure of the brackets 67 and 68.

[Structure of Inverter PCB Module]

Hereinafter, a structure and mounting structure of the inverter PCB module 61 will be described in detail with reference to the drawings.

Figure 19:
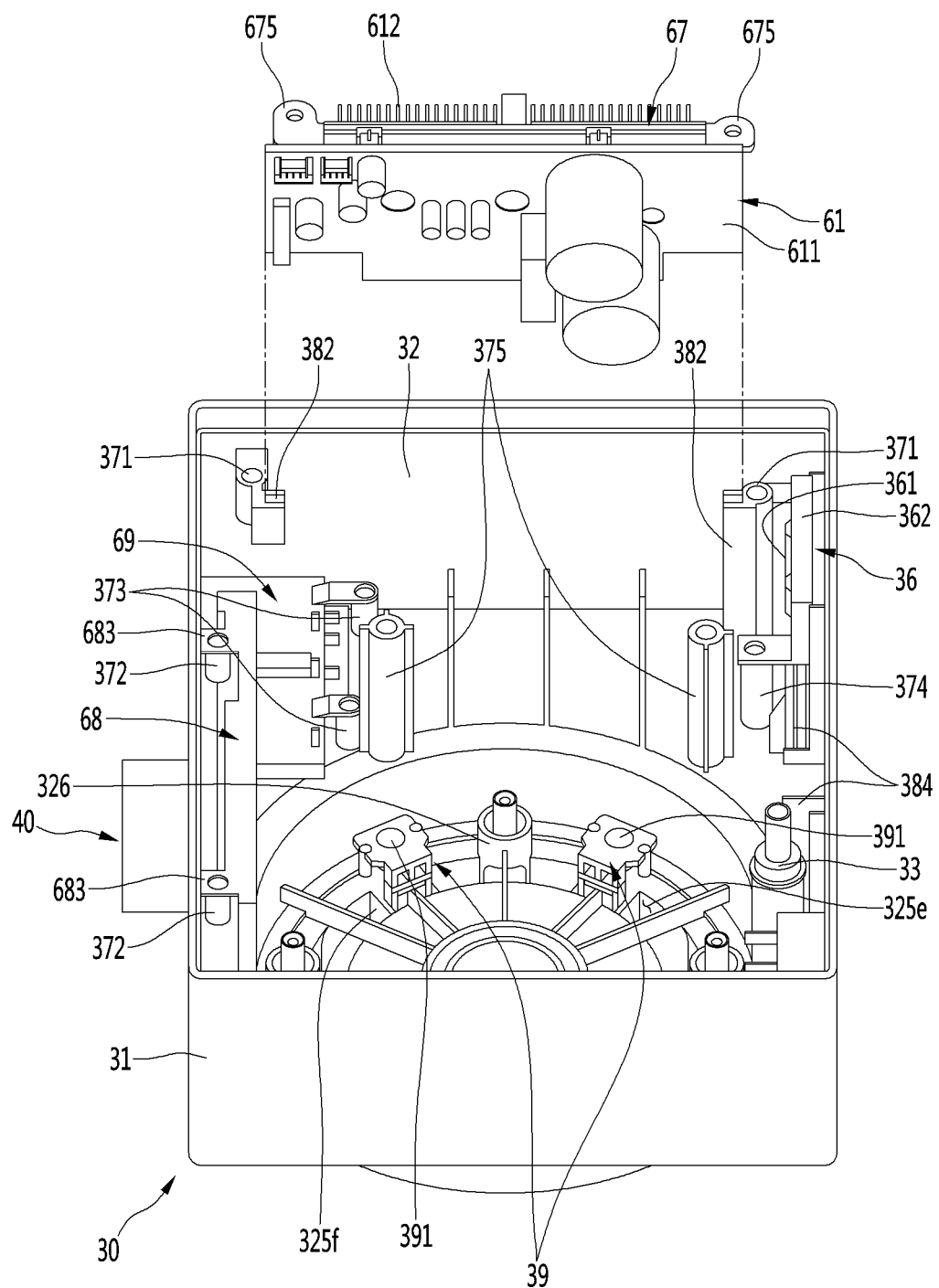
FIG. 19 is an exploded perspective illustrating a coupling relationship between the body and an inverter PCB module.
Figure 20:
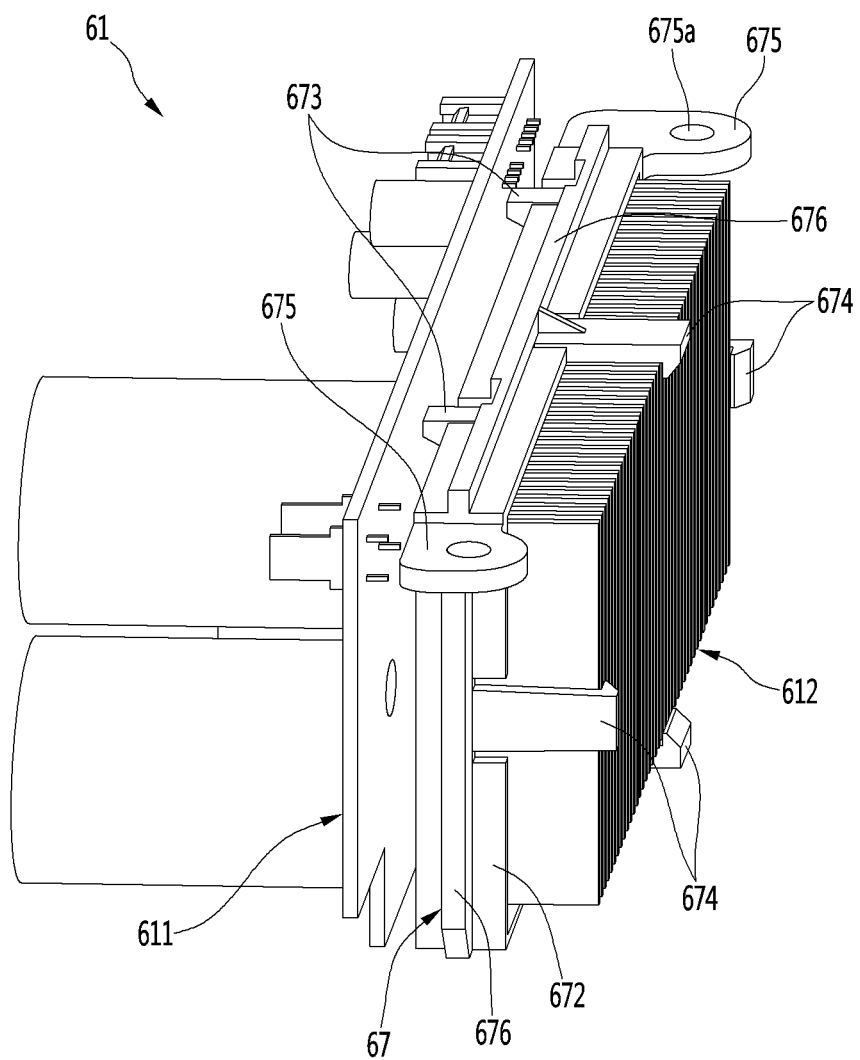
FIG. 20 is a perspective view of the inverter PCB module.
Figure 21:
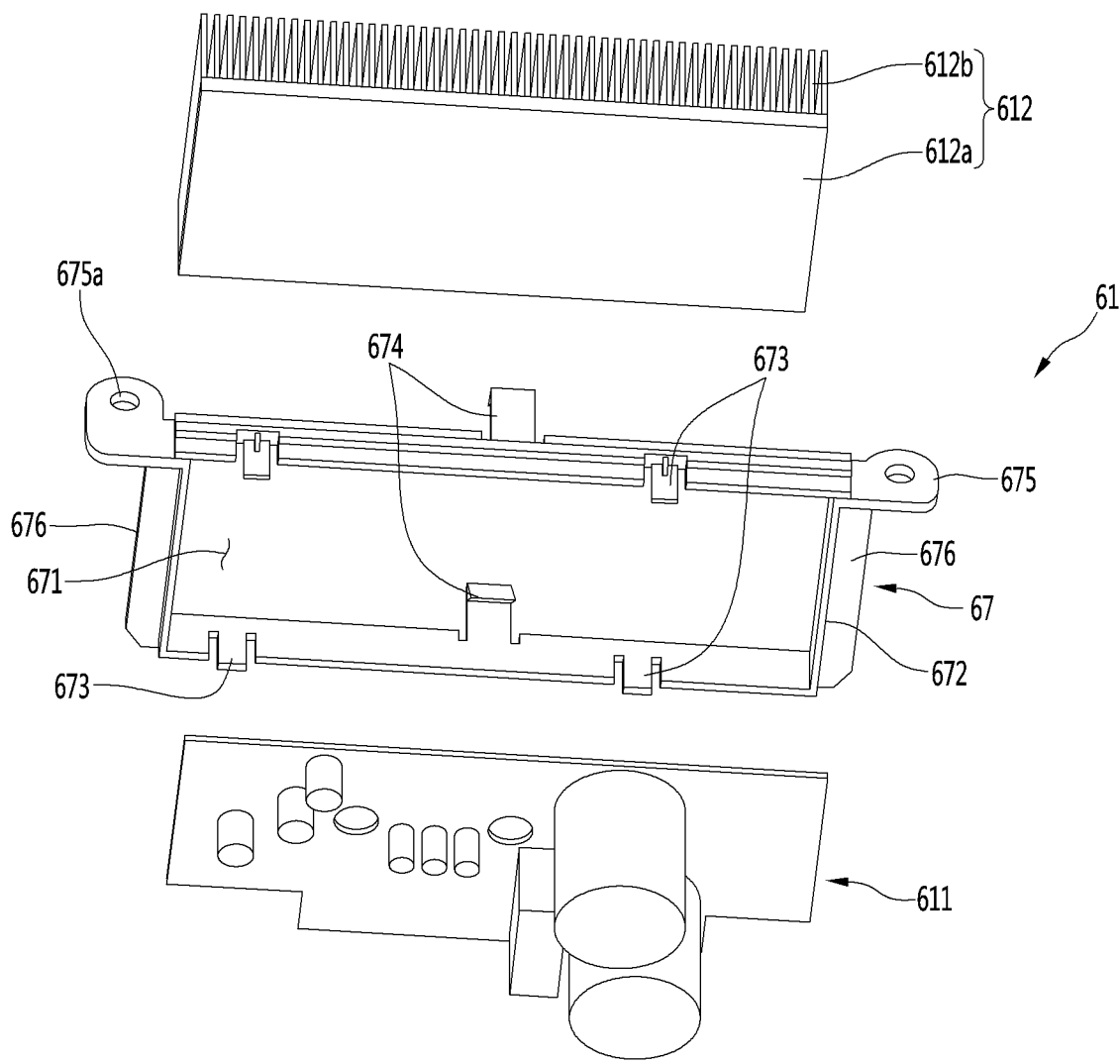
FIG. 21 is an exploded perspective view of the inverter PCB module.

FIG. 19 is an exploded perspective illustrating a coupling relationship between the body and an inverter PCB module. Also, FIG. 20 is a perspective view of the inverter PCB module. Also, FIG. 21 is an exploded perspective view of the inverter PCB module.

As illustrated in the drawings, the inverter PCB module 61 may have a relatively large size and may have a structure in which heat generation is severe due to the nature of its operation. Thus, the inverter PCB module 61 may include an inverter PCB 611, an inverter bracket 67, and a heat dissipation member 612.

The inverter PCB 611 may be provided to have a size that is enough to be mounted on one side of the inner case 32, the element disposed on the inverter PCB 611 may face the motor assembly 50, and the heat dissipation member 612. may be disposed to face the inner surface of the inner case 32.

The heat dissipation member 612 may include a base 612*a* provided in a plate shape that is in contact with the inverter PCB 611 and a plurality of fins 612*b* extending vertically from the base 612*a*. The fins 612*b* may extend in the vertical direction according to the upward flow of air introduced from the plate suction hole 719*a*. The plurality of fins 612*b* may be spaced apart from each other so that the air flowing upward passes between the plurality of fins 612*b* to effectively dissipate heat.

The heat dissipation member 612 may be made of a material having excellent heat exchange, such as aluminum, and when mounted on the inverter bracket 67, the heat dissipation member 612 may be maintained in a close contact with the inverter PCB 611.

The inverter bracket 67 may be configured so that the inverter PCB 611 is accommodated in one side thereof, and the heat dissipation member 612 is disposed at the other side thereof. The inverter bracket 67 may be provided in a rectangular frame shape having an opening 971 therein, and thus, the heat dissipation member 612 may be in direct contact with the element of the inverter PCB 611 to cool a specific device by the heat dissipation.

Referring to the structure of the inverter bracket 67 in more detail, the inverter bracket 67 may be provided in a rectangular frame shape so as to be in contact with a circumferential surface of the inverter PCB 611. In addition, the inverter bracket 67 may be provided to have a predetermined width to accommodate both the inverter PCB 611 and the heat dissipation member 612.

A PCB fixing portion 673 protruding toward the inverter PCB 611 may be disposed on an edge 672 of the inverter bracket 67. The PCB fixing portion 673 may be provided in a hook shape and may be hooked and restricted around the inverter PCB 611. The PCB fixing portion 673 may be provided at each of upper and lower ends of the inverter bracket 67 to restrict each of upper and lower ends of the inverter PCB 611. In addition, a plurality of the PCB fixing portions 673 may be provided at the upper and lower ends of the inverter bracket 67, respectively, so that the inverter PCB 611 is firmly coupled to the inverter bracket 67. In addition, the PCB fixing portion 673 may pass through the inverter PCB 611 so that the inverter PCB 611 is restricted.

In addition, a heat dissipation member fixing portion 674 protruding toward the heat dissipation member 612 may be disposed on one edge of the inverter bracket 67 opposite to the surface on which the PCB fixing portion 673 is disposed. The heat dissipation member fixing portion 674 may be provided in a hook shape and may extend to an end of the heat dissipation member 612 so that the end of the heat dissipation member 612 is hooked and restricted. The heat dissipation member fixing portion 674 may be provided in plurality along a circumference of the inverter bracket 67 and may be disposed on each of top, bottom, left and right sides so that the heat dissipation member 612 is maintained in the state of being fixed to the inverter bracket 67 as a whole.

In addition, the bracket fixing portions 675 protruding laterally may protrude from the left and right sides of the upper end of the edge of the inverter bracket 67. The bracket fixing portion 675 may have a hole 675*a* so that a screw passes therethrough, and after being seated on the inverter PCB mounting portions 371 and 381, the screw may be coupled to be fixed.

In detail, the bracket fixing portion 675 may extend laterally to be seated on the third coupling boss 371 and the PCB fixing protrusion 381. In addition, the screw coupled to the hole 675a of the bracket fixing portion 675 may be coupled to the screw holes 371a and 381a of the third coupling boss 371 and the PCB fixing protrusion 381, and thus, the inverter PCB module 61 may be firmly fixedly mounted on the inner case 32.

In addition, the bracket rib 676 may protrude along the edge 672 of the inverter bracket 67. The bracket rib 676 may be disposed along the entire rim 672 of the inverter bracket 67 to reinforce strength of the inverter bracket 67. In addition, the bracket ribs 676 may extend vertically from at least left and right both sides of the rim 672. The bracket rib 676 may be disposed to be inserted into the inverter PCB slot 382 defined in each of the third coupling boss 371 and the PCB fixing protrusion 381.

Thus, the inverter PCB module 61, in which the inverter PCB 611 and the heat dissipation member 612 are completely assembled to the inverter bracket 67, may be configured so that the bracket rib 676 is inserted to move along the inverter PCB slot 382, and after the inverter PCB module 61 is inserted, the screw is coupled to the bracket fixing portion 675 so as to be firmly coupled to the third coupling boss 371 and the PCB fixing protrusion 381.

[Lower Structure of Body]

Hereinafter, structures of the base plate 71 defining the lower portion of the body 30 and the bottom cover 74 will be described in more detail with reference to the drawings.

Figure 22:
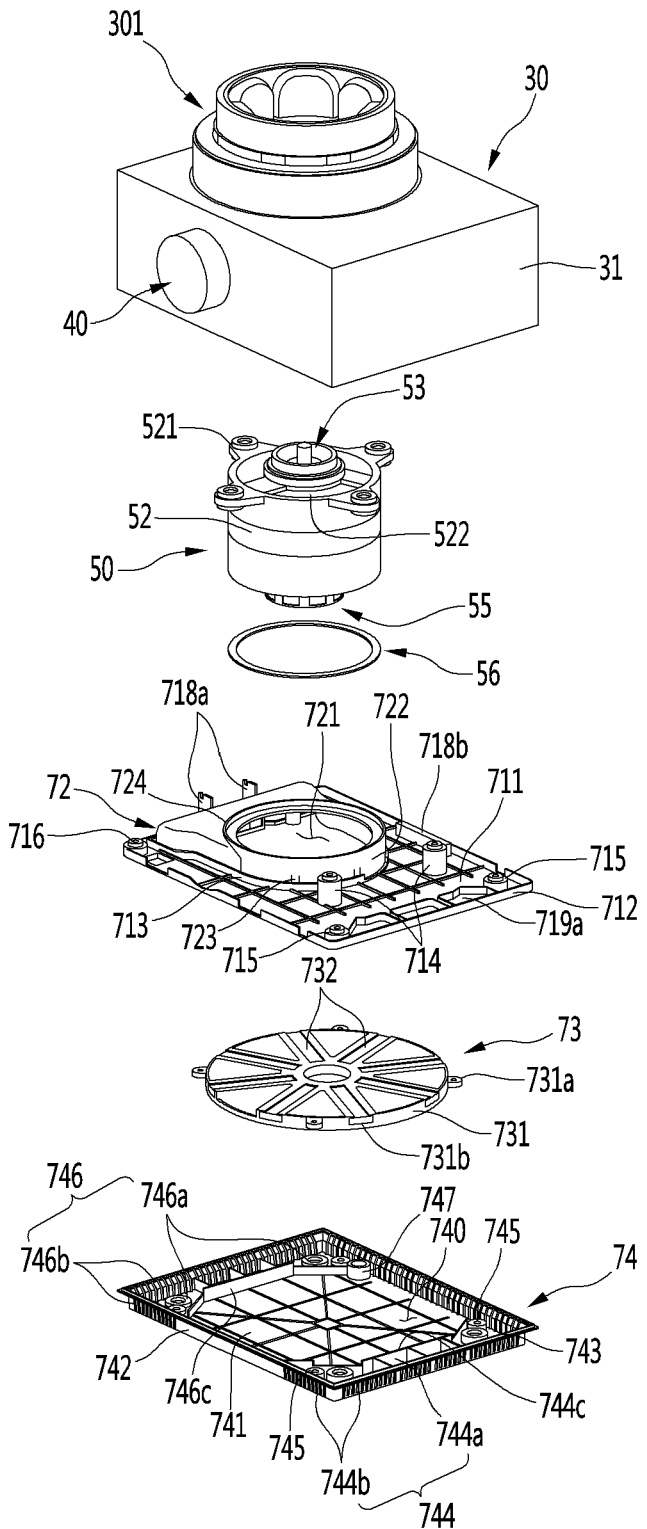
FIG. 22 is an exploded perspective view illustrating a state in which a motor, the base plate, a wireless power module, and a bottom cover are sequentially separated from the body.
Figure 23:
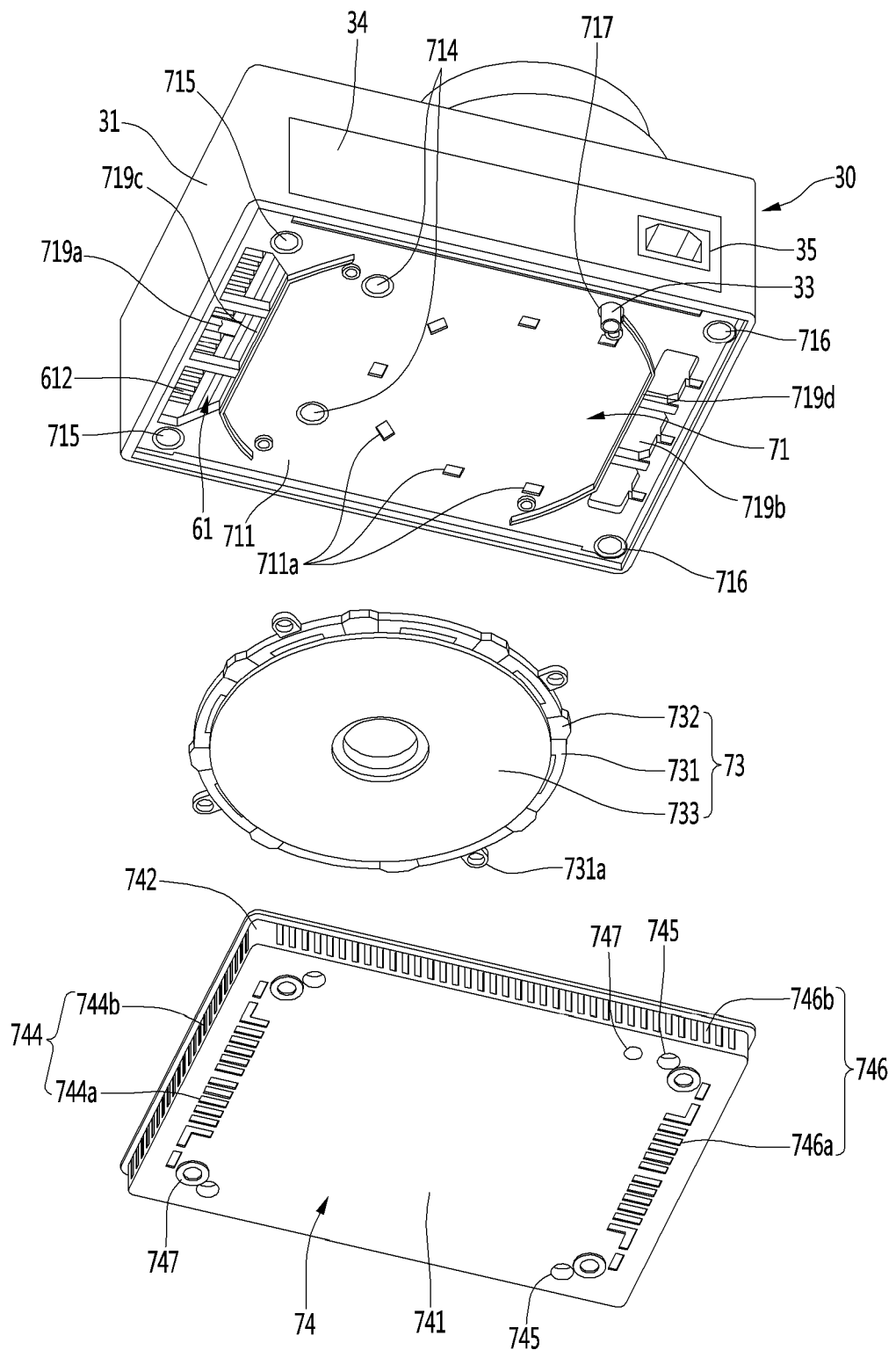
FIG. 23 is an exploded perspective view illustrating an arrangement of the wireless power module.

FIG. 22 is an exploded perspective view illustrating a state in which the motor, the base plate, the wireless power module, and the bottom cover are sequentially separated from the body. Also, FIG. 23 is an exploded perspective view illustrating an arrangement of the wireless power module.

As illustrated in the drawings, the motor assembly 50 may be mounted inside the body 30, and the opened bottom surface of the inner body 30 may be shielded by the base plate 71. In addition, the air guide 72 may be provided on a top surface of the base plate 71, and the wireless power module 73 may be provided on a bottom surface of the base plate 71. In addition, the bottom surface of the base plate 71 on which the wireless power module 73 is mounted may be shielded by the bottom cover 74.

Referring to this structure in more detail, the base plate 71 may include a plate-shaped plate portion 711 corresponding to the opened bottom surface of the inner case 32 and a plate edge portion 712 around the plate portion 711. The base plate 71 may be coupled to the inner case 32 to shield the opened bottom surface of the inner case 32. Here, the plate edge portion 712 may be in contact with a lower end of the inner case 32.

Referring to the coupling structure of the inner case 32 and the base plate 71, a first coupling portion 714 coupled to the first coupling boss 375 may be disposed at a center of the base plate 71, a second coupling portion 715 coupled to the second coupling boss 376 may be disposed on an edge of one end of the base plate 71, and a third coupling portion 716 coupled to the third coupling boss 371 and the PCB fixing protrusion 381 may be disposed on an edge of the other end of the base plate 71. A screw for coupling the base plate 71 may pass through the first coupling portion 714, the second coupling portion 715, and the third coupling portion 716. The base plate 71 may be coupled to the inner case 32 through the coupling of the screw.

The plate portion 711 may be provided with a plurality of reinforcing ribs that cross each other as a whole, to provide strength that is enough so that the air guide 72 and the wireless power module 73 are mounted on the plate-shaped base plate 71.

The plate suction hole 719a and the plate discharge hole 719b may be defined in both left and right ends of the plate portion 711 so as to be opened, respectively. Here, the plate suction hole 719a may be disposed vertically below the inverter PCB module 61, and the plate discharge hole 719b may be accommodated inside the air guide 72.

In addition, a power PCB lower restriction portion 718b may be disposed on a rear end of the plate part 711 corresponding to the power PCB module 62 on a circumference of the plate part 711. The power PCB lower restriction portion 718b may protrude upward to support and restrict the power PCB module 62 from below.

In addition, a filtering PCB lower restriction portion 718a may be disposed on one end of the plate part 711 corresponding to the filtering PCB module 63 on the circumference of the plate part 711. The filtering PCB lower restriction portion 718a may protrude upward to support and restrict the filtering PCB module 63 from below. Thus, the coupling restriction structure between the power PCB module 62 and the filtering PCB module 63 may be naturally possible due to the coupling of the base plate 71.

In addition, a plate hole 717 through which the drain pipe 33 passes may be defined in the plate part 711. An end of the drain pipe 33 may pass through the plate hole 717 and be connected to the cover hole 747 of the bottom cover 74 so that a liquid material of the seating portion 301 is discharged to a lower side of the bottom cover 74.

A guide rib 713 protruding along a circumference of the air guide 72 for mounting the air guide 72 may be disposed on a top surface of the plate part 711. The guide rib 713 may extend to be in contact with a circumference of a lower end of the air guide 72 to seal the circumference of the guide rib 713, thereby preventing air from leaking and also may support the air guide to be disposed at a correct position.

In addition, a guide coupling hole 711a into which a guide coupling protrusion 723 extending from a lower end of the air guide 72 is inserted and coupled may be defined in the bottom of the plate part 711 adjacent to the guide rib 713. Therefore, the air guide 72 may be inserted inside the guide rib 713, and the guide coupling protrusion 723 having the hook shape may be inserted into the guide coupling hole 711a to be coupled to the base plate 71. Each of the guide coupling protrusion 723 and the guide coupling hole 711a may be provided in plurality along the guide rib 713, and the entire lower end of the air guide 72 may be in close contact with the plate part 711.

The air guide 72 may be provided in a shape configured to guide the air passing through the motor assembly 50 toward the plate discharge hole 719b and may connect the bottom surface of the motor assembly 50 to the plate discharge hole 719b.

Particularly, the air guide 72 may be provided in a shape in which the cooling fan 55 provided on the lower end of the motor assembly 50 is accommodated. In addition, one end of the air guide 72 may be disposed along one end of the base plate 71 on which the plate discharge hole 719b is defined.

The air guide 72 may be provided so that the entire bottom surface is opened and be seated on the top surface of the plate portion 711 to shield the opened bottom surface and also provide an air flow path. Here, the plate discharge hole 719b may be defined in an inner region of the air guide 72.

The open bottom surface of the air guide 72 may be defined by a circumferential surface 722 extending downward, and a space, in which the cooling fan 55 is accommodated, and the air flow space may be defined by the circumferential surface 722.

A lower end of the circumferential surface 722 may be in vertically contact with the plate portion 711. In addition, the circumferential surface 722 may be disposed along the guide rib 713 so as to be in close contact with the guide rib 713. In addition, the plurality of guide coupling protrusions 723 may be disposed on the circumferential surface 722.

The guide hole 721 may be opened at an upper end of the air guide 72. The lower end of the motor assembly 50 may be seated around the guide hole 721, and the cooling fan 55 may be inserted by passing through the guide hole 721. The guide hole 721 may be defined to have a diameter less than that of the motor assembly 50 and larger than that of the cooling fan 55.

In addition, a supporting member mounting groove 724 in which the supporting member 56 is seated may be defined around the guide hole 721. The supporting member mounting groove 724 may be recessed along the circumference of the guide hole 721 to accommodate the supporting member 56.

The supporting member 56 may be made of a rubber or silicon material and support a circumference of the bottom surface of the motor assembly 50. That is, when the base plate 71 with the air guide 72 mounted thereon is coupled to the inner case 32, the cooling fan 55 may be disposed inside the air guide 72, and the motor assembly 50 may be supported from below by the air guide 72. Here, the supporting member 56 may seal a gap between the air guide 72 and the motor assembly 50 so that all of the air discharged from the motor housing 52 is directed to the inside of the air guide 72.

A suction guide 719*c* and a discharge guide 719*d*, which protrude downward, may be defined n a bottom surface of the base plate 71. The suction guide 719*c* may be disposed along a circumference of the plate suction hole 719*a* and may be disposed along one side of the plate suction hole 719*a* toward a central side of the body 30 among both sides of the plate suction hole 719*a*. In addition, both ends of the suction guide 719*c* may have structures extending obliquely toward the front and rear surfaces of the body 30, respectively. Thus, the air may be smoothly suctioned through the cover suction hole 744 in the bottom surface and the front and rear surfaces of the bottom cover 74.

Also, the discharge guide 719*d* may be disposed along a circumference of the plate discharge hole 719*b* and may be disposed along one side of the plate discharge hole 719*b* toward a central side of the body 30 among both sides of the plate discharge holes 719*b*. In addition, both ends of the discharge guide 719*d* may have structures extending obliquely toward the front and rear surfaces of the body 30, respectively. Thus, the air may be smoothly discharged through the cover discharge hole 746 in the front bottom surface and the front and rear surfaces of the bottom cover 74.

Bent ends of the suction guide 719*c* and the discharge guide 719*d* may be disposed to face each other. In addition, the suction guide 719*c* and the discharge guide 719*d* may guide a position at which the wireless power module 73 is mounted. That is, the suction guide 719*c* and the discharge guide 719*d* may be disposed along both sides of a circumference of the wireless power module 73, and the wireless power module 73 may be provided between the suction guide 719*c* and the discharge guide 719*d*.

The wireless power module 73 may have a structure capable of receiving power supplied by the induced electromotive force when the blender 1 is to be used wirelessly. That is, the wireless power module 73 may include a core bracket 731 fixedly mounted to the base plate 71, a ferrite core 732 radially disposed with respect to a center of the core bracket 731, and a coil 733 wound in a circular plate shape on a bottom surface of the ferrite core 732.

The core bracket 731 is provided in a plate shape and is provided to be filled in most of a remaining space between the plate suction hole 719*a* and the plate discharge hole 719*b* on the bottom surface of the base plate 71. In addition, a core groove 731*b* may be radially defined in the core bracket 731 with respect to a central portion of the core bracket 731, and the ferrite core 732 may be mounted in the core groove 731*b*. The core groove 731*b* may have a shape corresponding to that of the ferrite core 732 and may extend from the center of the core bracket 731 in an outer circumferential direction. The ferrite core 732 may be provided in a bar shape and may be disposed above the coil 733. The coil 733 may be continuously wound in the circumferential direction from the center of the core bracket 731 to form a plate shape. The coil 733 may be disposed adjacent to the bottom cover 74, be mounted on the bottom surface of the core bracket 731 in a molded state, and be disposed at the lowest portion except for the bottom cover 74.

The wireless power module 73 may be provided to be filled in most of the space between the suction guide 719*c* and the discharge guide 719*d* and may be disposed substantially on the lowermost surface of the blender 1 except for the bottom cover 74.

Therefore, when the induction operates after placing the blender 1 in a home appliance capable of generating induced electromotive force such as induction, power may be supplied to the blender 1 through the wireless power module 73. For this, the communication module 36 may have a structure capable of wireless communication with the induction, and an operation for supplying power to the induction may be controlled by the communication module 36. Thus, the blender 1 may be disposed at a specific position of the induction and aligned at a position at which power is supplied to the wireless power module 73 and then operate wirelessly by the user's manipulation.

The bottom cover 74 may be coupled to the bottom surface of the base plate 71 and may shield the base plate 71 from below to shield the wireless power module 73 as well as define the bottom surface of the blender 1.

The bottom cover 74 may include a plate-shaped bottom plate 741 and a bottom edge 742 extending upward along a circumference of the bottom plate 741. The bottom plate 741 may be provided in a rectangular shape that has a size slightly less than that of the opened bottom surface of the outer case 31. In addition, an upper end of the bottom edge 742 may be coupled to a lower end of the outer case 31. The bottom edge 742 may be inclined to connect the circumference of the bottom plate 741 to the lower end of the outer case 31.

A cover coupling hole 745 to which a screw coupled to the base plate 71 is coupled may be defined in the bottom plate 741. A pair of cover coupling holes 745 may be defined in both left and right sides of the bottom plate 741, respectively.

A drain pipe insertion hole 747 into which an end of the drain pipe 33 is inserted may be defined in the bottom plate 741. The drain pipe 33 may connect the drain hole 325*h* inside the seating portion to the drain pipe insertion hole 747 to allow water or foreign substances to be discharged through the bottom surface of the blender 1.

In addition, a bottom support 748 may be further provided on the bottom plate 741. The bottom support 748 may protrude downward from the bottom plate 741, and when the blender 1 is disposed in an installation space, the bottom surface of the blender 1, that is, the bottom plate 741 may be spaced apart from the bottom of the installation space. A pair of bottom supports 748 may be provided on both left and right sides, respectively, and may be disposed at four corners of the bottom plate 741. The bottom support 748 may be made of a rubber or silicon material to prevent sliding or reduce noise and vibration. The bottom support 748 may be separately molded and mounted on the bottom plate 741.

A cover suction hole 744 and a cover discharge hole 746 may be defined in the bottom cover 74. The cover suction hole 744 may include a bottom suction hole 744a defined in one side of the bottom plate part 711 and an edge suction hole 744b defined in the bottom edge 742. In addition, the cover discharge hole 746 may include a bottom discharge hole 746a defined in one side of the bottom plate part 711 and an edge discharge hole 744b defined in the bottom edge 742.

In detail, the bottom suction hole 744a may be defined vertically below the plate suction hole 719a defined in the base plate 71. In addition, the bottom suction hole 744a may be provided as a grill or a combination of a plurality of holes and may be disposed in an inner region of the plate suction hole 719a.

In addition, the edge suction hole 744b may be defined along the bottom edge 742 and may be continuously defined over a side surface and a portion of front and rear surfaces corresponding to the position of the bottom suction hole 744a. The edge suction hole 744b may be defined up to an end of at least the suction guide 719c or may be defined up to a side of the plate suction hole 719a.

The bottom discharge hole 746a may be defined vertically below the plate discharge hole 719b defined in the base plate 71. In addition, the bottom discharge hole 746a may be configured as a grill or a combination of a plurality of holes, and may be disposed in an inner region of the plate discharge hole 719b.

In addition, the edge discharge hole 744b may be defined along the bottom edge 742 and may be continuously defined over a side surface and a portion of front and rear surfaces corresponding to the position of the bottom discharge hole 746a. The edge discharge hole 746b may be defined up to an end of at least the discharge guide 719d or may be defined up to a side of the plate discharge hole 719b.

[Flow of Air Inside Body]

Hereinafter, a flow state of the cooling air of the blender 1 having the above structure will be described with reference to the drawings.

Figure 24:
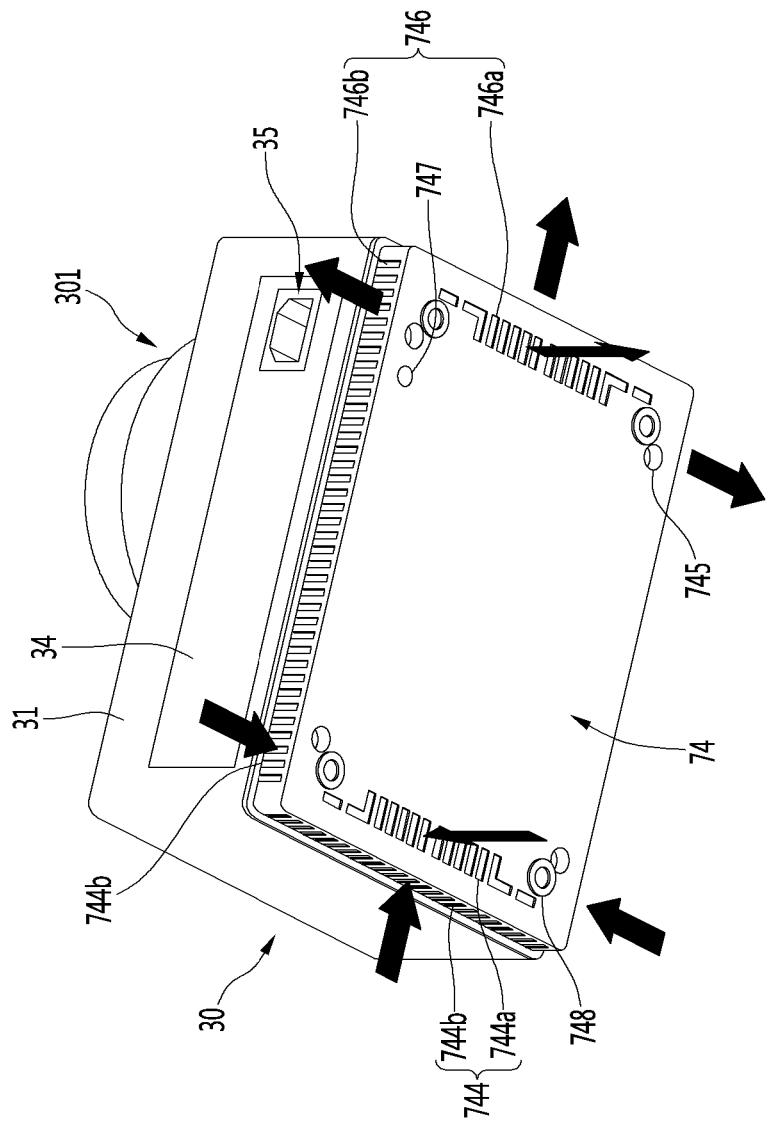
FIG. 24 is a view illustrating air suction and discharge states of the body.
Figure 25:
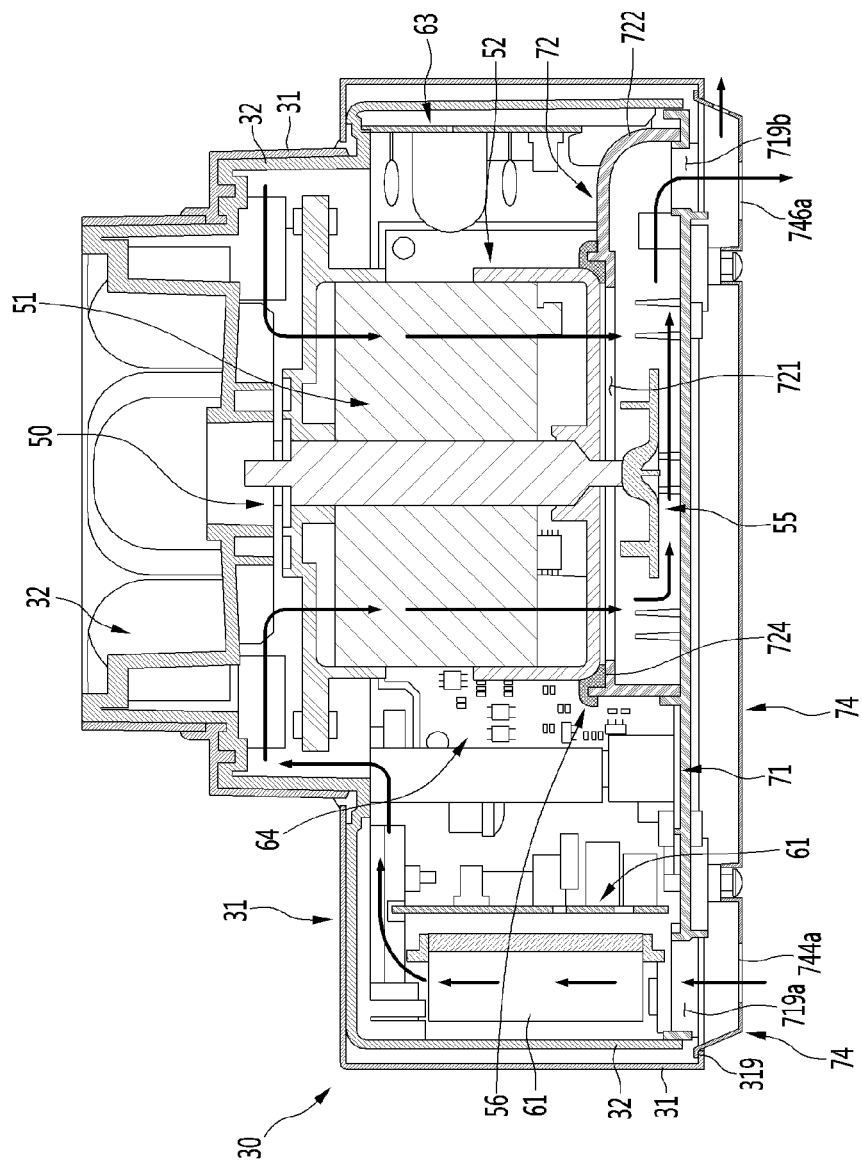
FIG. 25 is a cross-sectional view illustrating an air flow state within the body.
Figure 26:
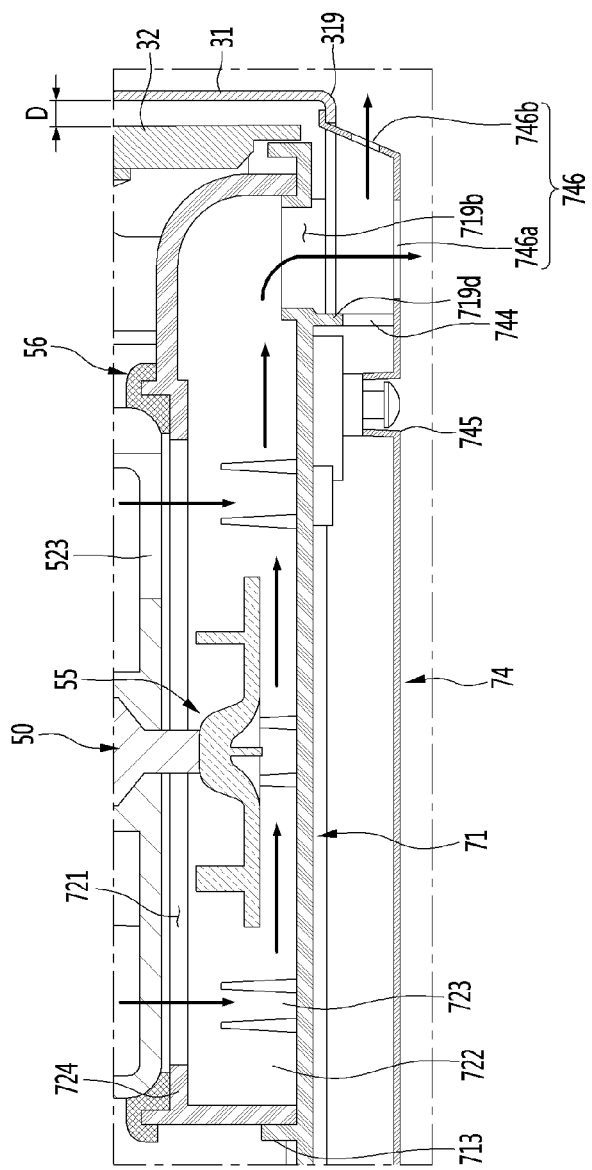
FIG. 26 is an enlarged view of a portion A of FIG. 25.
Figure 27:
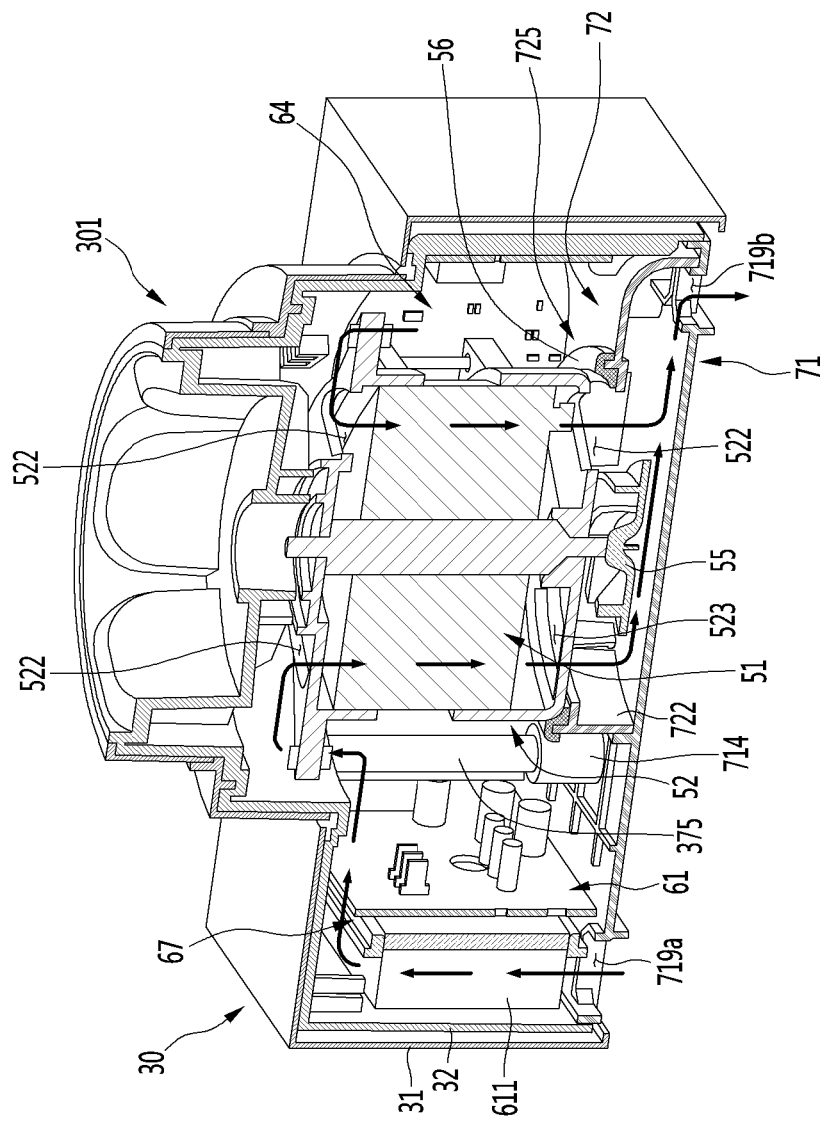
FIG. 27 is a perspective view illustrating the air flow state within the body.

FIG. 24 is a view illustrating air suction and discharge states of the body. Also, FIG. 25 is a cross-sectional view illustrating an air flow state within the body. Also, FIG. 26 is an enlarged view of a portion A of FIG. 25. Also, FIG. 27 is a perspective view illustrating the air flow state within the body.

As illustrated in the figures, when power is supplied to the blender 1 in a wireless or wired manner, an operable state is notified to the user through an audio output of an output means 642. In addition, the jar 10 may be seated on the seating portion 301 of the body 30, and the blade module 14 may be connected to the motor assembly 50.

In this state, the user operates the blender 1 through the manipulation of the manipulation portions 40 and 310b. That is, the operation state of the blender 1 may be set and input through the manipulation of the knob 40, and the operation of the blender 1 may be input through the manipulation of the touch manipulation portions 40 and 310b. Also, the setting state and the operation state of the blender 1 may be displayed through the display portion 310a.

When the blender 1 operates by the user's operation, the motor assembly 50 may rotate according to the input condition, and the blade 141 may rotate by the operation of the motor assembly 50. The food inside the jar 10 may be crushed or cut or processed in a liquid-like state by the rotation of the blade 141.

When the motor assembly 50 operates, the cooling fan 55 may also rotate. A forced flow of air may be generated in the body 30 by the rotation of the cooling fan 55.

In detail, air may be suctioned into the body 30 through the bottom suction hole 744a and the edge suction hole 744b. Here, the bottom suction hole 744a may suction air from the floor in a state away from the ground, and the edge suction hole 744b may suction air from three directions, i.e., toward a side surface and front and rear surfaces. Thus, three-dimensional air suction paths in all four directions may be provided in the lower portion of the blender 1, and smooth air suction may be ensured regardless of the arrangement state of the blender 1.

The air suctioned into the bottom suction hole 744a may be suctioned into the inner space of the inner case 32 through the plate suction hole 719a. Here, since the inverter PCB module 61 is disposed vertically above the plate suction hole 719a, the air flowing into the inner case 32 through the plate suction hole 719a may cool the inverter PCB module 61.

Particularly, in the inverter PCB module 61, since the heat dissipation member 612 defines a flow path between the inverter PCB 611 and the inner surface of the inner case 32, the suctioned air may effectively dissipate heat while passing through the heat dissipation member 612. In addition, the fins 612b of the heat dissipation member 612 may be disposed in a direction that intersects the flow direction of the air, and thus, the air flow may be possible along the spaced space between the fins 612b to secure the heat dissipation performance in contact with the entire surface of the fins 612b without disturbing the air flow.

As described above, the air suctioned into the inner case 32 may intensively cool the inverter PCB module 61, and even if the inverter PCB 611 generates high-temperature heat due to the characteristics of the inverter PCB 611, the inverter PCB 611 may be effectively cooled to prevent the overall heat generation of the blender and an abnormal operation or damage of the heat generation of the blender.

The air suctioned into the inner case 32 may be introduced into the housing upper hole 522 defined in the top surface of the motor assembly 50. Thus, the air cooling of the main PCB module 64, the power PCB module 62, and the filtering PCB module 63, which are disposed on the wall surface of the inner case 32, may also be possible while the air flows into the housing upper hole 522.

The air flowing into the housing upper hole 522 may move downward by the strong suction force of the cooling fan 55 and may be discharged downward through the housing lower hole 523. The air flowing from the upper side to the lower side of the motor housing 52 may intensively cool the motor 51. Since the cooling fan 55 rotates according to the rotation of the motor 51, effective cooling may be possible even when the motor 51 rotating at a high speed operates.

The air passing through the housing lower hole 523 may be introduced into the air guide 72 through the guide hole 721. Also, the cooling fan 55 may be discharged in a circumferential direction of the cooling fan 55. The air discharged by the cooling fan 55 may flow along the flow path provided by the air guide 72. The air flowing according to the guidance of the air guide 72 may be directed toward the plate discharge hole 719b and may be discharged downward through the plate discharge hole 719b.

Here, the air discharged from the plate discharge hole 719b may flow downward through the plate discharge hole 719b and may be discharged to the bottom discharge hole 746a and the edge discharge hole 746b. That is, a portion of the air discharged from the plate discharge hole 719b may be discharged downward from the blender 1 through the bottom discharge hole 746a defined vertically below the plate discharge hole 719b. In addition, a remaining portion of the air discharged from the plate discharge hole 719b may be discharged through the edge discharge hole 746b in the three directions, i.e., toward the side surface and the front and rear surfaces. Thus, three-dimensional air discharge paths in all four directions may be provided in the lower portion of the blender 1, and smooth air discharge may be ensured regardless of the arrangement state of the blender 1.

INDUSTRIAL APPLICABILITY

Since the blender according to an embodiment of the present invention has the improved cooling performance in the body within the blender, industrial applicability is high.

The invention claimed is:
1. A blender comprising:
a container in which at least one blade is positioned;
a body including
an outer case made of metal that forms an exterior and has an open bottom, and
an inner case having a bottom surface including an opening, said inner case made of plastic material and positioned within the outer case;
a motor provided inside the body and configured to rotate the blade;
a fan provided below the motor, the fan configured to be rotated by the motor to generate a flow of air within the body;
a base plate covering the opening of the bottom surface of the inner case, the base plate including a first plate hole through which air is suctioned into the body when the fan is rotated and a second plate hole through which air is discharged out of the body when the fan is rotated;
at least one printed circuit board (PCB) disposed between a peripheral surface of the inner case and the motor, and disposed above the first plate hole to be cooled by air suctioned into the body through the first plate hole; and
an air guide configured to fluidly connect the motor to the second plate hole so as to define an air discharge path,
wherein a plurality of bosses are formed in the inner case and extend toward the bottom surface of the inner case, and
a plurality of screws penetrating the base plate, each of said plurality of screws is fastened to one of the plurality of bosses to couple the base plate to the inner case.
2. The blender according to claim 1,
wherein the air guide is mounted on the base plate and is configured to support the motor from below.
3. The blender according to claim 2,
wherein an upper end of the motor is positioned below a top surface of the body.
4. The blender according to claim 1,
wherein the motor is positioned between the first plate hole and the second plate hole in a plan view.
5. The blender according to claim 4,
wherein the PCB is positioned between the motor and the first plate hole in the plan view.
6. The blender according to claim 5,
wherein the PCB includes an inverter PCB configured to control a rotation speed of the motor.
7. The blender according to claim 1,
wherein the air guide includes:
a guide hole configured to communicate with the motor; and
a circumferential surface positioned along a circumference of an opened bottom surface of the air guide, the circumferential surface extending to be in contact with the base plate so as to define an air flow space.
8. The blender according to claim 7,
wherein the fan is provided inside the air flow space defined by the circumferential surface of the air guide.
9. The blender according to claim 7,
wherein the second plate hole is provided in a region of the base plate within the circumferential surface of the air guide.
10. The blender according to claim 9,
wherein
the second plate hole is defined in a first end of the base plate, and
the first plate hole is defined outside the region of the base plate within the circumferential surface of the air guide, the first plate hole being defined in a second end of the base plate, which differs from the first end on which the second plate hole is provided.
11. The blender according to claim 7,
wherein a coupling protrusion coupled to the base plate is provided on a lower end of the circumferential surface of the air guide.
12. The blender according to claim 7,
wherein a seal configured to seal a gap between the motor and the air guide is provided on a circumference of the guide hole.
13. The blender according to claim 1,
wherein the motor includes:
a motor shaft;
a motor housing in which the motor is accommodated;
a first motor housing hole at one side of the motor housing; and
a second motor housing hole at a second side of the motor housing to communicate with the air guide,
wherein the fan is coupled to the motor shaft below the second motor housing hole such that the flow of air passes through the first hole and the second hole when the motor rotates the motor shaft.
14. The blender according to claim 13,
wherein the first motor housing hole is defined above the motor, and the second motor housing hole is defined below the motor.
15. The blender according to claim 13,
wherein
a housing mounting surface protruding outward is provided on the motor housing, and
the housing mounting surface is coupled to an inner surface of the body so that the first motor housing hole is spaced from the inner surface of the body.
16. The blender according to claim 1, further comprising a plurality of PCBs
wherein the plurality of PCBs include an inverter PCB that is configured to control a rotation speed of the motor and is positioned at a side of the first plate hole.

17. The blender according to claim 16,
wherein the inverter PCB includes:
- a first surface on which at least one circuit board element is mounted; and
- a second surface on which a heat sink to dissipate heat of the inverter PCB is provided, wherein the heat sink is positioned to overlap the first plate hole.

18. The blender according to claim 17, wherein the heat sink includes fins extending in a vertical direction and spaced apart from each other, and the fins extend in a direction crossing the first plate hole.

19. The blender according to claim 1, further comprising a bottom cover below the base plate,
wherein the bottom cover comprises:
- a bottom plate positioned to be spaced apart from the ground, the bottom plate being configured to define a bottom surface of the body; and
- a bottom edge extending along a circumference of the bottom plate so as to be coupled to a circumference of an opened bottom of the body, wherein the bottom cover includes at least one first cover hole and at least one second cover hole that are positioned to communicate with the first plate hole and the second plate hole, respectively.

20. The blender according to claim 19 wherein the at least one first cover hole includes:
- a first bottom hole in the bottom plate and vertically below the first plate hole; and
- a first edge hole defined along the bottom edge to correspond to the first bottom hole, wherein the at least one second cover hole includes:
- a second bottom hole in the bottom plate vertically below the second plate hole; and
- a second edge hole defined along the bottom edge to communicate with the second bottom hole.

21. The blender of claim 1, wherein the body has an open bottom, and the base plate is provided at the open bottom of the body.

22. The blender of claim 1, wherein the fan provided on a rotation shaft of the motor such that the fan is rotated when the motor is driven to rotate the blade.

* * * * *